US011322795B2

(12) United States Patent
Shinomiya et al.

(10) Patent No.: US 11,322,795 B2
(45) Date of Patent: May 3, 2022

(54) METHOD FOR PRODUCING SEPARATOR ROLL

(71) Applicant: Sumitomo Chemical Company, Limited, Tokyo (JP)

(72) Inventors: Yoshitaka Shinomiya, Daegu (KR); Koji Kashu, Ehime (JP); Yasuyuki Kondo, Ehime (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 80 days.

(21) Appl. No.: 16/835,481

(22) Filed: Mar. 31, 2020

(65) Prior Publication Data

US 2020/0227710 A1 Jul. 16, 2020

Related U.S. Application Data

(62) Division of application No. 15/825,264, filed on Nov. 29, 2017, now Pat. No. 10,811,652.

(30) Foreign Application Priority Data

Nov. 30, 2016 (JP) .............................. JP2016-233579
Jun. 30, 2017 (JP) .............................. JP2017-129781

(51) Int. Cl.
*H01M 50/403* (2021.01)
*G01N 23/04* (2018.01)
(Continued)

(52) U.S. Cl.
CPC .......... *H01M 50/403* (2021.01); *B65H 21/00* (2013.01); *B65H 26/00* (2013.01);
(Continued)

(58) Field of Classification Search
CPC ........ B65H 18/28; B65H 21/00; B65H 26/00; B65H 2301/542; B65H 2515/84;
(Continued)

(56) References Cited

U.S. PATENT DOCUMENTS 5,336,573 A * 8/1994 Zuckerbrod ........ H01M 50/449
429/252
6,593,152 B2 7/2003 Nakasuji et al.
(Continued)

FOREIGN PATENT DOCUMENTS

CN 101021491 A 8/2007
CN 104135613 A 11/2014
(Continued)

OTHER PUBLICATIONS

Office Action dated Oct. 21, 2019 in U.S. Appl. No. 15/825,264 by Shinomaya.
(Continued)

*Primary Examiner* — Carl J Arbes
(74) *Attorney, Agent, or Firm* — Panitch Schwarze Belisario & Nadel LLP

(57) ABSTRACT

To carry out accurate defect inspection over a wide area, a defect inspection device includes: a radiation source section configured to emit an electromagnetic wave to a separator roll; and a sensor section configured to detect the electromagnetic wave that the radiation source section has emitted to the separator roll, the sensor section being configured to detect the electromagnetic wave before and after the separator roll is moved relative to the radiation source section.

3 Claims, 24 Drawing Sheets

(51) Int. Cl.
   B65H 26/00 (2006.01)
   B65H 21/00 (2006.01)
   H01M 10/0525 (2010.01)
   B65H 18/28 (2006.01)

(52) U.S. Cl.
   CPC .............. *G01N 23/04* (2013.01); *B65H 18/28* (2013.01); *B65H 2301/542* (2013.01); *B65H 2515/84* (2013.01); *B65H 2553/40* (2013.01); *G01N 2223/3306* (2013.01); *G01N 2223/646* (2013.01); *H01M 10/0525* (2013.01)

(58) Field of Classification Search
   CPC .............. B65H 2553/40; G01N 23/04; G01N 2223/3306; G01N 2223/646; H01M 10/0525; H01M 50/403
   See application file for complete search history.

(56) References Cited

U.S. PATENT DOCUMENTS

| | | | |
|---|---|---|---|
| 7,138,629 | B2 | 11/2006 | Noji et al. |
| 7,662,510 | B2 * | 2/2010 | Zhang .................. H01M 50/411 429/164 |
| 7,683,319 | B2 | 3/2010 | Makino et al. |
| 7,687,176 | B2 | 3/2010 | Roscoe et al. |
| 7,902,518 | B2 * | 3/2011 | Ballard ............. H01M 10/4285 250/390.06 |
| 8,859,984 | B2 | 10/2014 | Noji et al. |
| 9,390,886 | B2 | 7/2016 | Nakasuji et al. |
| 2002/0015143 | A1 | 2/2002 | Yin et al. |
| 2002/0166802 | A1 * | 11/2002 | Jung ...................... G01N 23/04 209/575 |
| 2016/0161423 | A1 | 6/2016 | Ortner et al. |

FOREIGN PATENT DOCUMENTS

| | | |
|---|---|---|
| JP | 2004-200012 A | 7/2004 |
| JP | 2010257861 A | 11/2010 |
| JP | 5673621 B2 | 2/2015 |
| WO | 2013063278 A1 | 5/2013 |

OTHER PUBLICATIONS

Ex Parte Quayle Action dated Feb. 28, 2020 in U.S. Appl. No. 15/825,264 by Shinomaya.
Grigorovich, "gamma ray Inspection of Metal Quality," Metallurgical Industry Press, First Edition, pp. 75 and 77, (Sep. 1955).
Office Action dated Apr. 26, 2021 in CN Application No. 201711232881.X.
Qunzhu, M., "International DICOM Standard Chinese Version (2015C vol. IV)," University of Electronic Science and Technology Press, 2 pages (Aug. 31, 2016).
Office Action dated Sep. 13, 2021 in Chinese Application No. 201711232881.
Optical Basic Course, Wu Xiaohong et al.,Huazhong University of Science and Technology Press, 1st edition, Feb. 2012, p. 200.
Optical Interference Coatings, N. Kaiser and H. K. Pulker, translated by Liu Xu, et al., published by Zhejiang University Press, Aug. 2008, 1st edition, p. 20.
Office Action dated Dec. 13, 2021 in Chinese Application No. 201711232881.

* cited by examiner

METHOD FOR PRODUCING SEPARATOR ROLL

This application is a Divisional of Ser. No. 15/825,264, filed on Nov. 29, 2017, which claims priority under 35 U.S.C. § 119 to Japanese Application No. 2017-129781, filed on Jun. 30, 2017, and Japanese Application No. 2016-233579, filed on Nov. 30, 2016, the disclosures of all of which are incorporated herein by reference.

TECHNICAL FIELD

The present invention relates to (i) a device for inspecting a separator roll for a defect, (ii) a method for inspecting a separator roll for a defect, and (iii) a method for producing a separator roll.

BACKGROUND ART

A lithium-ion secondary battery includes a cathode and an anode that are separated by a porous separator. Lithium-ion secondary batteries are produced with use of a separator roll, which includes a cylindrical core and the above separator wound around the core. A separator roll may have a defect as a result of, for example, trapping a foreign object inside the separator during the production. This necessitates inspecting the separator for a defect. In a case where in particular, a separator has a defect caused by an electrically conductive foreign object such as metal, the foreign object may cause a short circuit inside the lithium-ion secondary battery.

Patent Literature 1 discloses a defect inspection device configured to (i) emit visible light and infrared light to a surface of a sheet being conveyed and (ii) on the basis of data on an image captured in correspondence with the amount of each of the visible light and the infrared light reflected, determine whether a defect on the surface of the sheet is caused by metal.

CITATION LIST

Patent Literature

[Patent Literature 1]
Japanese Patent No. 5673621

SUMMARY OF INVENTION

Technical Problem

The defect inspection device disclosed in Patent Literature 1 is configured to inspect a sheet for a defect on a surface of the sheet while the sheet is being conveyed. The defect inspection device is, however, incapable of determining the presence or absence of a defect accurately because the defect is moved together with the sheet.

Further, in a case where the defect inspection device disclosed in Patent Literature 1 inspects a target object for a defect which target object has an area larger than the detector, the defect inspection device is incapable of carrying out the defect inspection for a sufficient region of the target object. This may result in a false negative during the inspection.

The present invention has been accomplished in view of the above issue. It is an object of the present invention to carry out accurate defect inspection over a wide area.

Solution to Problem

In order to attain the above object, a defect inspection device in accordance with an embodiment of the present invention includes: a holding mechanism configured to hold a separator roll including (i) a core in a cylindrical shape and (ii) a separator for use in a battery which separator is wound around the core; a radiation source section configured to emit an electromagnetic wave to the separator roll; and a sensor section configured to detect the electromagnetic wave that the radiation source section emits to the separator roll, the separator roll being movable relative to the radiation source section, the sensor section being configured to detect the electromagnetic wave before and after the separator roll is moved relative to the radiation source section.

In order to attain the above object, a defect inspection method in accordance with an embodiment of the present invention includes the steps of: (a) causing a radiation source section to emit an electromagnetic wave to a separator roll including (i) a core in a cylindrical shape and (ii) a separator for use in a battery which separator is wound around the core; and (b) detecting the electromagnetic wave having been emitted to the separator roll, the step (b) being a step of detecting the electromagnetic wave before and after the separator roll is moved relative to the radiation source section.

Advantageous Effects of Invention

An embodiment of the present invention advantageously makes it possible to carry out accurate defect inspection over a wide area.

DESCRIPTION OF EMBODIMENTS

Embodiment 1

(Process of Producing Separator Roll)

Figure 1A:
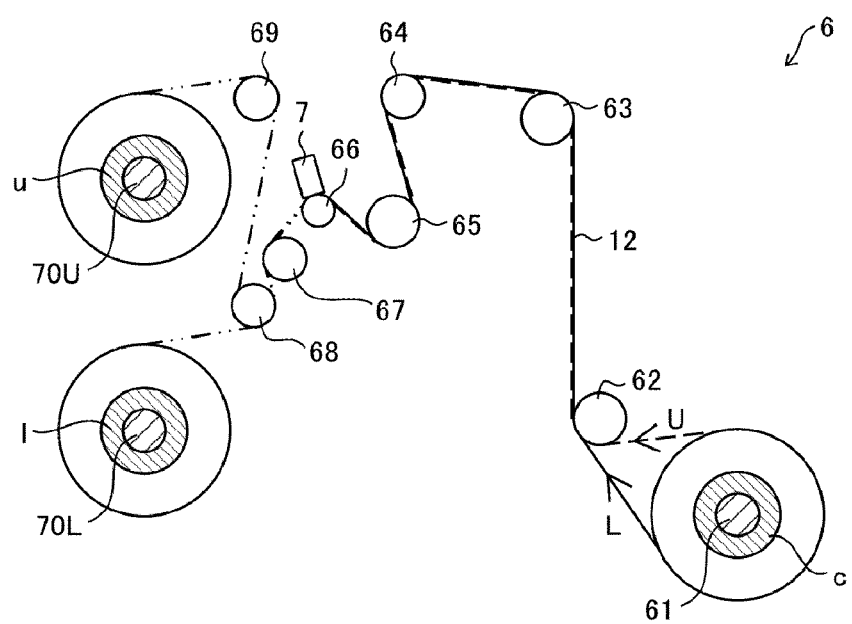
FIGS. 1a and 1b provide diagrams schematically illustrating the configuration of a slitting apparatus in accordance with Embodiment 1 of the present invention.
Figure 1B:
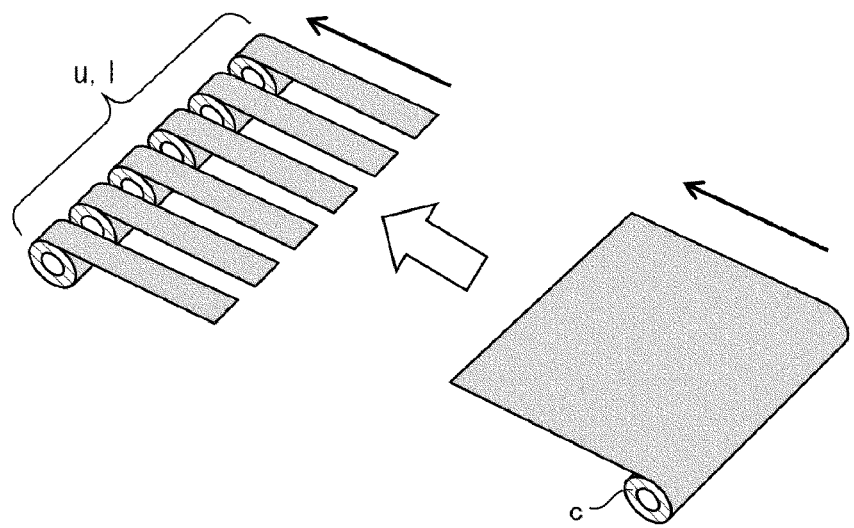

With reference to FIGS. 1a and 1b, the description below first deals with a process of producing a separator roll in accordance with Embodiment 1 of the present invention.

FIGS. 1a and 1b provide diagrams schematically illustrating a configuration of a slitting apparatus 6 configured to slit a separator original sheet. FIG. 1a illustrates the entire configuration, and FIG. 1b illustrates an arrangement before and after slitting a separator original sheet.

While separating the cathode (which is the positive electrode of a lithium-ion secondary battery or the like) and the anode, the separator 12, which is a porous film, allows lithium ions to move between the cathode and the anode. The separator 12 contains, for example, a polyolefin (for example, polyethylene or polypropylene) as a material thereof.

The separator 12 may include a porous film and a heat-resistant layer on a surface of the porous film to have heat resistance. The heat-resistant layer may contain, for example, wholly aromatic polyamide (aramid resin) as a material thereof.

The separator 12 may be a layered porous film including (i) a porous film containing a polyolefin and (ii) a functional layer(s) such as an adhesive layer and a heat-resistant layer. The functional layer contains resin. Examples of the resin include: a polyolefin such as polyethylene or polypropylene; a fluorine-containing polymer such as polyvinylidene fluoride (PVDF), polytetrafluoroethylene, or a vinylidene fluoride-hexafluoropropylene copolymer; an aromatic polyamide; a rubber such as a styrene-butadiene copolymer and a hydride thereof, a methacrylate ester copolymer, an acrylonitrile-acrylic ester copolymer, or a styrene-acrylic ester copolymer; a polymer having a melting point or glass transition temperature of not lower than 180° C.; and a water-soluble polymer such as polyvinyl alcohol, polyethylene glycol, cellulose ether, sodium alginate, polyacrylic acid, polyacrylamide, or polymethacrylic acid. The functional layer may contain a filler made of an inorganic substance or organic substance. The inorganic filler is made of, for example, an inorganic oxide such as silica, magnesium oxide, alumina, aluminum hydroxide, or boehmite. Alumina has crystal forms such as α-alumina, β-alumina, γ-alumina, and θ-alumina, and any of the crystal forms may be used. The resin and the filler may each contain (i) only one kind or (ii) two or more kinds in combination. In a case where the functional layer contains a filler, the filler may be contained in an amount of not less than 1% by volume and not more than 99% by volume of the functional layer.

The separator 12 should desirably contain as small an amount of water as possible for a minimized influence on the defect inspection described later. The defect inspection during the defect inspection step described later involves causing an electromagnetic wave such as X rays to pass through a separator 12 in order to inspect the separator 12, wound around a core, for a foreign object inside the separator 12. Since water decreases the transmittance of an electromagnetic wave such as X rays, the separator 12 containing a large amount of water will undesirably decrease the accuracy of the defect inspection.

The separator 12 may contain water in an amount of preferably up to approximately 2000 ppm. This makes it possible to (i) prevent a decrease in the transmittance of an electromagnetic wave such as X rays and (ii) accurately inspect a separator wound around a core for a defect inside the separator during the defect inspection step described later.

The separator 12 may preferably have a width (hereinafter referred to as "product width") suitable for an application product such as a lithium-ion secondary battery. For an improved productivity, however, a separator is first produced to have a width that is equal to or larger than the product width. Then, after having been produced to have a width equal to or larger than the product width, the separator is slit to have the product width.

The expression "width of a/the separator" refers to that dimension of the separator which extends in a direction substantially perpendicular to the longitudinal direction of the separator and to the thickness direction of the separator. The description below uses the term "original sheet" to refer to a wide separator that has not been slit. Further, expressions such as "slitting" mean making a slit in a separator original sheet in the longitudinal direction (that is, the direction [carrying direction] in which the film is transferred during the production; machine direction [MD]), and expressions such as "cutting" mean cutting a separator original sheet in the transverse direction (TD). The transverse direction (TD) refers to a direction that is substantially perpendicular to the longitudinal direction (MD) of the separator and to the thickness direction of the separator.

The slitting apparatus 6 is configured to slit an original sheet. The slitting apparatus 6 includes a rotatably supported cylindrical wind-off roller 61, rollers 62 to 69, and wind-up rollers 70U and 70L.

In the slitting apparatus 6, a cylindrical core c around which an original sheet is wound is fit on the wind-off roller 61.

The original sheet is wound off from the core c to a route U or L. The original sheet having been wound off is conveyed to the roller 68 via the rollers 62 to 67. During the step of conveying the original sheet from the roller 67 to the roller 68, the original sheet is slit into a plurality of separators (slitting step). The slitting apparatus 6 includes a slitting device (not shown in FIGS. 1a and 1b) disposed near the roller 68 and configured to slit an original sheet into a plurality of separators.

After the slitting step, some of the separators produced by slitting the original sheet are each wound around a cylindrical core u (bobbin) fit on the wind-up roller 70U, whereas the other of the separators are each wound around a cylindrical core 1 (bobbin) fit on the wind-up roller 70L (separator winding step).

The present specification uses the term "separator roll" to refer to that which includes (i) a separator produced by slitting an original sheet and (ii) a core (bobbin) around which the separator is wound in the shape of a roll. The present embodiment is configured to, after a separator roll has been produced through the separator winding step, inspect the separator roll for any foreign object inside the separator (wound around the core) during the defect inspection step described later. During the slitting step described above, a foreign object tends to result from, for instance, a metal slitting blade being chipped and the resulting piece adhering to a surface of a slit separator. The defect inspection step may thus preferably be carried out after the slitting step. This makes it possible to efficiently inspect, during the defect inspection step, a separator for any foreign object resulting from the slitting step, during which a foreign object tends to result.

Separator rolls that have been determined as non-defective during the defect inspection step are later packed together in a package during a packaging step for storage.

The separator 12 produced by slitting an original sheet during the slitting step and wound around a core may preferably have a width (that is, the dimension in the TD) of, for example, approximately not less than 30 mm and not more than 100 mm. If the separator 12 has an excessively large width, an electromagnetic wave such as X rays will not easily pass through the separator 12 for the defect inspection during the defect inspection step described later, with the result of a decrease in the accuracy of the defect inspection. In view of that, the separator 12 having a width of approximately not more than 100 mm makes it possible to (i) prevent a decrease in the transmittance of an electromagnetic wave such as X rays and (ii) accurately inspect a separator wound around a core for a defect inside the separator during the defect inspection step described later.

(Configuration of Separator Roll)

Figure 2A:
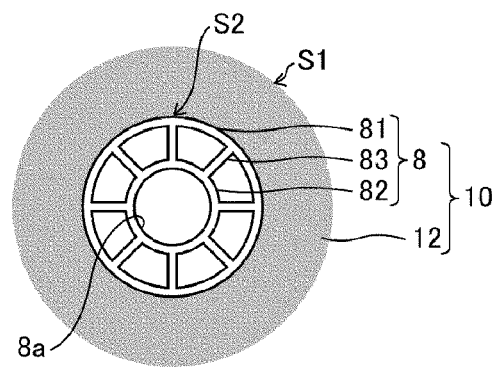
FIGS. 2a, 2b, 2c, and 2d show diagrams each schematically illustrating the configuration of a separator roll in accordance with Embodiment 1 of the present invention, where (2a) illustrates a separator that has not been wound off from a core, (2b) illustrates a separator that has been wound off from a core, (2c) illustrates a core from which a separator has been wound off and removed, and (2d) illustrates the separator of (2b) from a different angle.
Figure 2B:
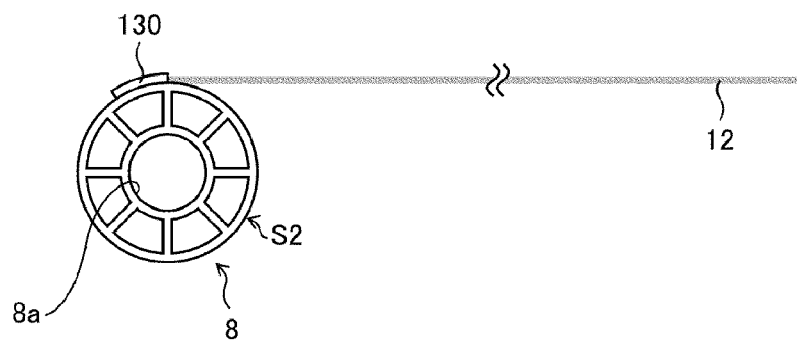
Figure 2C:
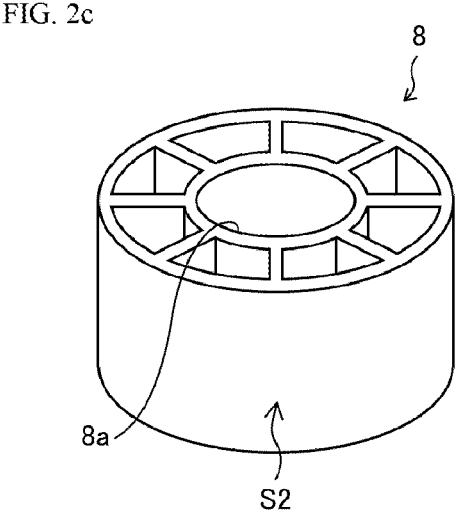
Figure 2D:
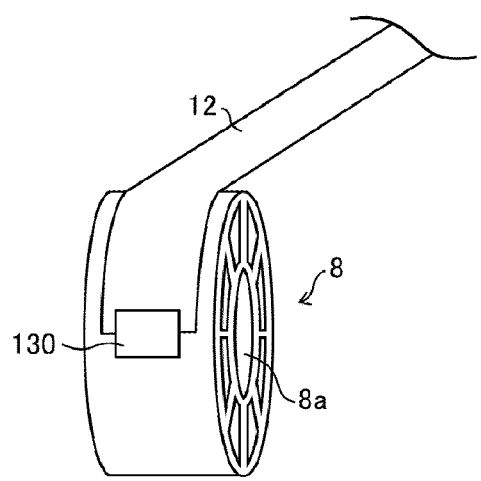

FIGS. 2a, 2b, 2c, and 2d show diagrams each schematically illustrating the configuration of a separator roll 10 in accordance with Embodiment 1 of the present invention. FIG. 2a illustrates a separator 12 that has not been wound off from a core 8. FIG. 2b illustrates a separator 12 that has been wound off from a core 8. FIG. 2c illustrates a core 8 from which a separator 12 has been wound off and removed. FIG. 2d illustrates the separator 12 of FIG. 2b from a different angle.

As illustrated in FIGS. 2a-2d, a separator roll 10 includes a core 8 and a separator 12 wound around the core 8. The separator 12 has been produced by slitting an original sheet as described above. The present specification uses the term "outer peripheral surface S1" to refer to, among a plurality of surfaces of a separator roll 10, the outer peripheral surface of the separator 12 wound in the shape of a roll.

The core 8 includes an outer cylindrical part 81, an inner cylindrical part 82, and a plurality of ribs 83. The core 8 is identical to the cores u and 1 mentioned above.

The outer cylindrical part 81 is a cylindrical member around which a separator 12 is to be wound to be in contact with the outer peripheral surface S2 of the outer cylindrical part 81. The inner cylindrical part 82 is a cylindrical member having a central hole 8a in which a wind-up roller or the like is to be fit to be in contact with the inner peripheral surface of the inner cylindrical part 82. The ribs 83 are support members that (i) extend from the outer peripheral surface of the inner cylindrical part 82 to the inner peripheral surface of the outer cylindrical part 81 and that (ii) support the outer cylindrical part 81 from the side of its inner peripheral surface.

The core 8 contains ABS resin as a material thereof. The material of the core 8 in accordance with Embodiment 1 of the present invention is, however, not limited to ABS resin. The core 8 may contain, as a material thereof, a resin other than ABS resin such as polyethylene resin, polypropylene resin, polystyrene resin, or vinyl chloride resin. The core 8 should preferably not contain metal, paper, or fluorocarbon resin as a material thereof.

As illustrated in FIGS. 2b and 2d, the separator 12 has an end attached to the core 8 with adhesive tape 130. Specifically, the separator 12 has an end fixed to the outer peripheral surface S2 of the core 8 with use of adhesive tape 130 provided with an adhesive. An end of the separator 12 may be fixed to the outer peripheral surface S2 by, instead of using adhesive tape 130, applying an adhesive directly to an end of the separator 12, using a clip, or the like method.

(Configuration of Defect Inspection Device 1)

Figure 3:
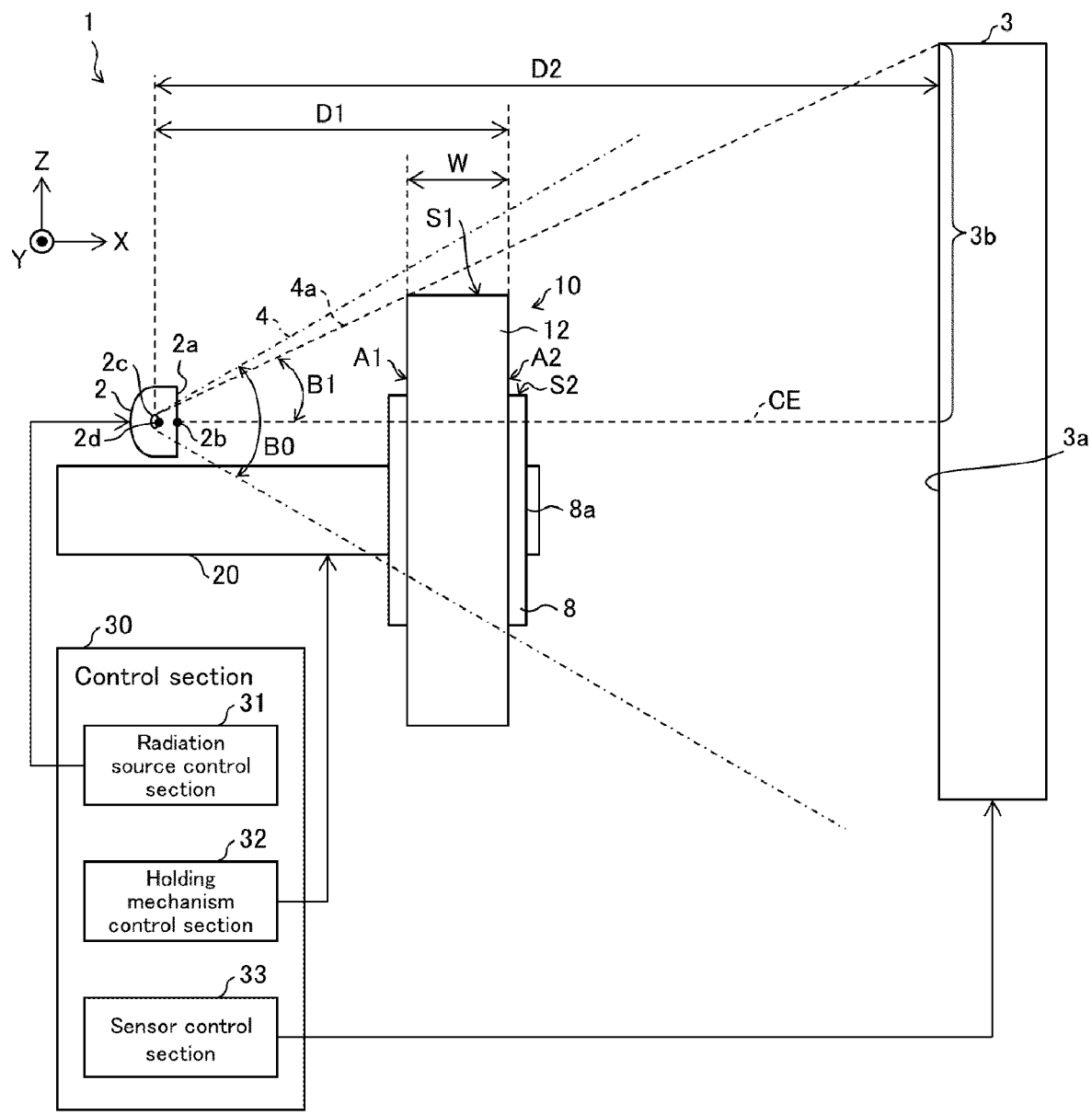
FIG. 3 is a diagram schematically illustrating the configuration of a defect inspection device in accordance with Embodiment 1 of the present invention.

FIG. 3 is a diagram schematically illustrating the configuration of a defect inspection device 1 in accordance with Embodiment 1 of the present invention. The defect inspection device 1 is configured to inspect a separator roll 10 for a defect during the defect inspection step. The present embodiment assumes that the defect inspection device 1 is configured to inspect a wound separator 12 for any foreign object inside the separator 12.

The defect inspection device 1 includes (i) a radiation source section 2 configured to emit an electromagnetic wave 4, (ii) a sensor section 3 configured to detect the electromagnetic wave 4 emitted by the radiation source section 2, and (iii) a holding mechanism 20 configured to hold a separator roll 10. The defect inspection device 1 further includes a control section 30 configured to control driving of the entire defect inspection device 1 which driving includes driving of the radiation source section 2, driving of the sensor section 3, and driving of the holding mechanism 20.

The control section 30 includes (i) a radiation source control section 31 configured to control driving of the radiation source section 2, (ii) a holding mechanism control section 32 configured to control driving of the holding mechanism 20, and (iii) a sensor control section (captured-image generating section) 33 configured to, for example, control driving of the sensor section 3 and obtain a captured image based on detection information from the sensor section 3.

The defect inspection device 1 is configured such that at least the radiation source section 2, the holding mechanism 20, and the sensor section 3 are surrounded by a wall (not shown in FIG. 3) containing, for example, lead to prevent an electromagnetic wave from passing therethrough easily so that the electromagnetic wave used does not leak outward. The wall may surround at least the radiation source section 2, the sensor section 3, and the holding mechanism 20.

The present embodiment is configured such that the radiation source section 2 emits an electromagnetic wave 4 in the X-axis direction (that is, the left-right direction of FIG. 3) and that the vertical direction (that is, the up-down direction of FIG. 3), which is perpendicular to the X axis, corresponds to the Z-axis direction.

The holding mechanism 20 is configured to hold a separator roll 10 as an inspection target in such a manner as to be capable of moving the separator roll 10 in the X-axis direction and the Z-axis direction. The holding mechanism 20, in other words, moves the separator roll 10 relative to the radiation source section 2. The holding mechanism 20 may be configured to be capable of moving the separator roll 10 also in the Y-axis direction (that is, the direction perpendicular to the surface of FIG. 3), which is perpendicular to the X-axis direction and the Z-axis direction.

The holding mechanism 20 is shaped to extend in the X-axis direction. The forward end of the holding mechanism 20 is inserted in the central hole 8*a* of a separator roll 10 so that the separator roll 10 is supported by the holding mechanism 20. With this configuration, the separator roll 10 is set in such a manner that in the defect inspection device 1, at least a portion of the separator 12 wound around the core 8 is present between the radiation source section 2 and the sensor section 3.

The holding mechanism 20 may, for prevention of generation of a metal foreign object, preferably be configured such that at least its sliding section is made of resin. The resin is not limited to any kind. Examples of the resin include: a general-purpose resin such as polyethylene resin, polypropylene resin, polystyrene resin, vinyl chloride resin, acrylic resin, ABS, or polyester; an engineering plastic such as polyacetal, polyamide, polycarbonate, or modified polyphenylene ether; and a super engineering plastic such as polyalylate, polysulfone, polyether sulfone, polyphenylene sulfide, polyether ether ketone, polyimide, or polyetherimide. As the resin is for use in the sliding section, the resin may preferably be, among the above resins, an abrasion-resistant super engineering plastic, more preferably polyether ether ketone. Embodiment 3 described later of the present invention may preferably be configured such that the holding mechanism 20 is entirely made of resin.

A separator roll 10 may be fitted on the holding mechanism 20 by, for example, (i) moving a separator roll 10, with use of a robot arm or manually, from a place such as a rack or conveyor belt on which separator rolls 10 that have not been subjected to defect inspection are placed and (ii) fitting the separator roll 10 on the holding mechanism 20 so that the forward end of the holding mechanism 20 is inserted through the separator roll 10.

A separator roll 10 may be removed from the holding mechanism 20 holding the separator roll 10 by, for example, removing, with use of a robot arm or manually, the separator roll 10 that has been subjected to defect inspection. The separator roll 10, which has been removed from the holding mechanism 20, is placed on, for example, a rack or conveyor belt.

A robot arm may have the function of the holding mechanism 20. Such a configuration in which a robot arm has the function of the holding mechanism 20 will be described later with reference to FIG. 25.

With a separator roll 10 set on the holding mechanism 20, the defect inspection device 1 is configured such that the radiation source section 2, the separator roll 10, and the sensor section 3 are arranged in this order in the X-axis direction. The separator roll 10 set on the holding mechanism 20 has opposite side surfaces, one of which faces the emitting surface 2*a* of the radiation source section 2 and the other of which faces the detecting surface 3*a* of the sensor section 3. The present specification uses (i) the term "first side surface A1" to refer to that side surface of the separator roll 10 which is close to the radiation source section 2 and (ii) the term "second side surface A2" to refer to that side surface of the separator roll 10 which is close to the sensor section 3.

The defect inspection device 1 in accordance with the present embodiment is configured to repeat the operation of (i) rotating the separator roll 10, which is held by the holding mechanism 20, in the θ direction by a predetermined angle and (ii) capturing an image of the separator roll 10 in order to capture an image of the entire separator 12 wound around the core 8 in the shape of a ring. This image capturing will be described later in detail with reference to, for example, FIG. 4.

As illustrated in FIG. 3, the sensor section 3 is a detector capable of detecting, at the detecting surface 3*a*, the electromagnetic wave emitted by the radiation source section 2. The sensor section 3, when it has detected the electromagnetic wave emitted by the radiation source section 2, outputs to the sensor control section 33 an electric signal corresponding to the intensity of the electromagnetic wave detected. The sensor control section 33, when it has received such electric signals from the sensor section 3, generates a captured image on the basis of those electric signals.

The sensor section 3 is a detector capable of detecting an electromagnetic wave having a wavelength range identical to the wavelength range of the electromagnetic wave that the radiation source section 2 emits. For instance, in a case where the radiation source section 2 is configured to emit X rays, the sensor section 3 is a detector capable of detecting X rays; in a case where the radiation source section 2 is configuration to emit γ rays, the sensor section 3 is a detector capable of detecting γ rays; and in a case where the radiation source section 2 is configured to emit visible light, the sensor section 3 is a detector capable of detecting visible light.

The present embodiment is configured such that the sensor section 3 is capable of detecting X rays and is a flat-panel detector (FPD) including pixels arranged in a matrix. The sensor section 3 is a FPD including, for example, pixels arranged in a matrix of 1500×1500 or 2000×2000 which pixels each have a size (for example, 20 µm to 2000 µm) suitable for the size of a foreign object as a detection target.

The sensor section 3 may have a detecting surface 3a having an area smaller than the area of the corresponding side surface of the separator roll 10. This is because the present embodiment is configured to create a captured image of the entire separator roll 10 by (i) repeating the operation of rotating the separator roll 10 and capturing an image of a portion of the separator 12 wound around the core 8 in multiple layers in the shape of a ring, (ii) extracting necessary regions from those captured images, and (iii) connecting the necessary regions.

The radiation source section 2 of the present embodiment is configured to emit an electromagnetic wave 4 that passes, in the transverse direction (TD), through the separator 12 of a separator roll 10 which separator 12 has a width W. Examples of such an electromagnetic wave 4 include an electromagnetic wave having a wavelength within a range of 1 pm to 10 nm.

The electromagnetic wave 4, which the radiation source section 2 emits, may preferably be X rays among others. This makes it possible to produce a defect inspection device that is inexpensive and easy to use.

The electromagnetic wave 4, which the radiation source section 2 emits, may preferably have an intensity of not less than 1 W. This ensures that the electromagnetic wave 4 passes through a separator 12 in the transverse direction (TD), as compared to a case in which the defect inspection device 1 uses γ rays as the electromagnetic wave 4. If the electromagnetic wave 4 has a low intensity, the exposure time period will need to be long. In view of that, the electromagnetic wave 4, which the radiation source section 2 emits, may more preferably have an intensity of not less than 10 W. This allows the exposure time period to be short.

If the electromagnetic wave 4 has too high an intensity, the radiation source section 2 may have a short life. In view of that, the electromagnetic wave 4, which the radiation source section 2 emits, may preferably have an intensity of not more than 100 W. This prevents the radiation source section 2 from having a short life.

In a case where the defect inspection device 1 inspects a side surface of a wound separator 12 for a defect not inside the separator roll 10 such as the separator 12 having been wound with a widthwise displacement, the radiation source section 2 may emit, for example, infrared light, visible light, or ultraviolet light.

In this case, the sensor section 3 also needs to be capable of detecting infrared light, visible light, or ultraviolet light, and needs to be disposed on that side of the separator roll 10 on which the radiation source section 2 is disposed. This configuration allows (i) the infrared light, visible light, or ultraviolet light emitted by the radiation source section 2 to be reflected by the side surface of the separator roll 10 and (ii) that reflected light to be detected by the sensor section 3. This makes it possible to create a defect inspection image of a side surface of a separator roll 10.

The emitting surface 2a of the radiation source section 2, from which emitting surface 2a the radiation source section 2 emits the electromagnetic wave 4, faces the detecting surface 3a of the sensor section 3 with a separator roll 10 therebetween that has been set in the defect inspection device 1.

In a case where the electromagnetic wave 4 of the present embodiment has a wavelength within a range of 1 μm to 10 nm, the present specification may use the particular term "focus 2c" to refer to the point source of the radiation source section 2 which point source is for emitting the electromagnetic wave 4 radially. The focus 2c has a center 2d that coincides with the center 2b of the emitting surface 2a as viewed in the X-axis direction.

Figure 14:
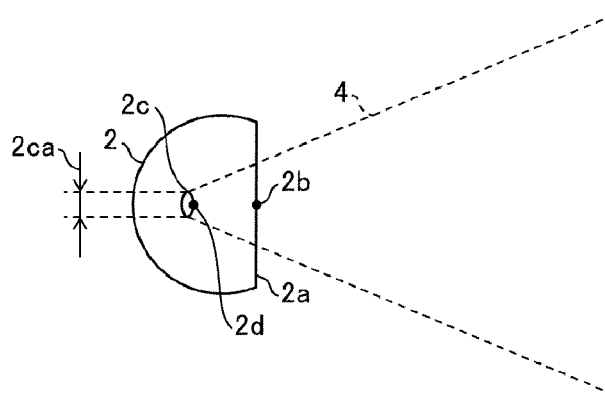
FIG. 14 is a diagram schematically illustrating the configuration of a radiation source section in accordance with Embodiment 1 of the present invention.

FIG. 14 is a diagram schematically illustrating the configuration of a radiation source section 2 in accordance with Embodiment 1 of the present invention. The radiation source section 2 may ideally have a point light source. The focus 2c typically has a diameter 2ca within a range of approximately 1 μm to 20 μm.

Figure 15:
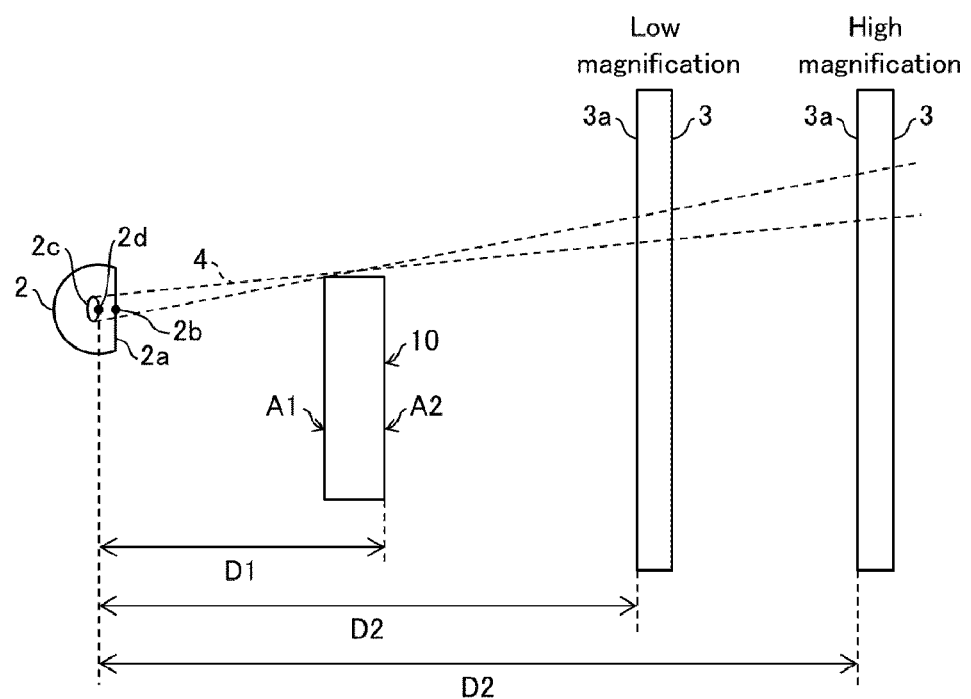
FIG. 15 is a diagram illustrating how a defect inspection device in accordance with Embodiment 1 of the present invention carries out a measurement at a high magnification and at a low magnification.

The present embodiment assumes that a separator roll 10 has opposite side surfaces, one of which is a first surface A1 facing the radiation source section 2 and the other of which is a second surface A2 facing the sensor section 3, as illustrated in FIGS. 3 and 15. The present embodiment also assumes that (i) the focus 2c and the second surface A2 of the separator roll 10 are separated from each other by a distance D1 and that (ii) the focus 2c and the detecting surface 3a of the sensor section 3 are separated from each other by a distance D2.

As illustrated in FIG. 15, in a case where the defect inspection device 1 carries out a measurement at a high magnification, there will be a large influence of displacement due to the size of the focus 2c. The case of carrying out a measurement at a high magnification means a case of carrying out a measurement in which D2(D2/D1) is large relative to D1, whereas the case of carrying out a measurement at a low magnification means a case of carrying out a measurement in which D2 (D2/D1) is small relative to D1.

As illustrated in FIG. 3, the radiation source section 2 emits an electromagnetic wave 4 toward a side surface of a separator roll 10. Assuming that the separator 12 of the separator roll 10 has a width W in the transverse direction (TD), the radiation source section 2, in response to an instruction from the radiation source control section 31, emits an electromagnetic wave 4 having an intensity that allows the electromagnetic wave 4 to pass through the width W of the separator 12.

The sensor section 3 detects the electromagnetic wave 4, which has been emitted by the radiation source section 2 and has passed through the separator roll 10. This configuration makes it possible to inspect a separator roll 10 for a defect inside the separator roll 10 such as a foreign object inside the separator roll 10.

As described above, the defect inspection device 1 is capable of, after a separator roll 10 has been produced (that is, after a separator 12 has been wound around a core), inspecting the separator 12 around a core for a defect inside the separator 12. This eliminates the need to prepare a defect inspection device for each of a plurality of sheet-shaped separators produced by slitting an original sheet during the slitting step. This in turn eliminates the need to prepare a large number of defect inspection devices.

The radiation source section 2 emits an electromagnetic wave 4 to a separator roll 10 held by the holding mechanism 20, and the sensor section 3 detects that electromagnetic wave 4. This configuration eliminates the need to capture an image of a separator 12 being conveyed, thereby making it possible to capture an image of a separator roll 10 at rest. This in turn ensures a sufficient exposure time period, thereby making it possible to capture a clear image for accurate defect inspection.

While the exposure time period may preferably be long for an improved signal-to-noise ratio (SN ratio), the exposure may be a continuous exposure operation or include a plurality of repeated short-time exposure operations. In a case where the defect inspection device 1 has captured images through a plurality of repeated short-time exposure operations, the defect inspection device 1 then superimposes each image over the others. Carrying out such a plurality of exposure operations is preferable because it reduces noise over continuous exposure.

The defect inspection device 1 does not need to capture an image of the full length of a separator 12 being conveyed, and is capable of inspecting a separator roll 10 as a wound product. This makes it possible to carry out defect inspection within a short time.

In a case where the defect inspection involves use of a high-energy electromagnetic wave such as X rays or γ rays, a radiation source and a sensor need to be surrounded by a wall containing, for example, lead for prevention of influence on the human body. If such a configuration is to be used to carry out defect inspection through emission of X rays to a separator or separator roll being conveyed, the surrounding wall will need to be large, with the unfortunate result of a large device.

In contrast, the defect inspection device 1, which is configured to capture an image of a separator roll 10 held by the holding mechanism 20, can include a relatively small wall around the radiation source section 2 and the sensor section 3 in a case where the defect inspection device 1 uses X rays or γ rays as the electromagnetic wave 4. As a result, the defect inspection device 1 can be relatively small as a whole.

The radiation source section 2 emits an electromagnetic wave 4 to a separator roll 10 from the side of a side surface of the separator roll 10. This configuration makes it possible to create a captured image based on an electromagnetic wave 4 that has passed through, of the entire separator roll 10, only the separator 12 wound around a core 8. This in turn makes it possible to create a particularly clear captured image of the inside of a separator 12 wound around a core 8.

The radiation source section 2 is configured to emit an electromagnetic wave 4 to a separator roll 10 in such a manner that the electromagnetic wave 4 strikes not only the separator 12 wound around a core 8 but also the core 8. The image captured by the sensor section 3 detecting an electromagnetic wave 4a may preferably include not only an image of the separator 12 but also an image of the core 8. The defect inspection device 1 is capable of creating a captured image of a wide area of a separator roll 10 as described above. This configuration makes it possible to reduce the number of image-capturing operations necessary and inspect the entire separator roll 10 thoroughly for a defect.

In a case where the defect inspection device 1 uses X rays or γ rays as the electromagnetic wave 4, the radiation source section 2 emits the electromagnetic wave 4 from the focus $2c$ radially with an angle B0. Thus, that electromagnetic wave 4 which has been emitted from the center $2b$ of the emitting surface $2a$ of the radiation source section 2 (that is, that electromagnetic wave 4 which has been emitted from the focus $2c$ in a direction perpendicular to the emitting surface $2a$) travels through a separator roll 10 in a direction parallel to the film surface of the separator 12 wound around a core 8 and strikes the detecting surface $3a$ of the sensor section 3 in a direction perpendicular to the detecting surface $3a$. That electromagnetic wave 4 which has been emitted from a position apart from the center $2b$ of the emitting surface $2a$ of the radiation source section 2 (that is, that electromagnetic wave 4 which has been emitted from the focus $2c$ in a direction inclined from the electromagnetic wave 4 that has been emitted in a direction perpendicular to the emitting surface $2a$) travels through a separator roll 10 in an accordingly oblique direction relative to the film surface of the separator 12 wound around a core 8 and strikes the detecting surface $3a$ of the sensor section 3 in an accordingly oblique direction relative to the detecting surface $3a$.

An emission line may show in that region of a captured image of a wound separator 12 which has been obtained on the basis of an electromagnetic wave 4 that has traveled through the wound separator 12 in a direction parallel to the film surface of the separator 12, as compared to that region of the captured image which has been obtained on the basis of an electromagnetic wave 4 that has traveled through the wound separator 12 in an oblique direction relative to the film surface of the separator 12. The emission line renders less visible an image of a defect caused by, for example, a foreign object inside a wound separator 12, and may result in a false negative in defect detection. In a case where a captured image shows an emission line, a false negative in defect detection may be prevented by (i) changing the positional relationship between the radiation source section 2 and the separator 12 and (ii) capturing an image again of that portion in which the emission line is observed. Specifically, after an image has been captured of an outer peripheral region of a separator 12, an image is captured again of that inner peripheral region of the separator 12 which coincides with that outer peripheral region in which an emission line shows. This makes it possible to inspect a separator 12 for a defect without a false negative in defect detection even in a case where an emission line shows in an outer peripheral region of the separator 12. Further, capturing a plurality of images of overlapping regions while changing the positional relationship between the radiation source section 2 and a separator 12 as described above makes it possible to prevent a false negative in detecting a flat, thin foreign object among foreign objects each having a circumscribed sphere with a diameter of not less than 100 μm.

In terms of prevention of an emission line, the radiation source section 2 may preferably have an emitting surface $2a$ whose center $2b$ is so positioned as not to face that portion of the corresponding side surface of a separator roll 10 held by the holding mechanism 20 which is not the wound separator 12, and may more preferably have an emitting surface $2a$ whose center $2b$ is so positioned as to face the corresponding side surface of the core 8, which is closer to the center of the separator roll 10 than the ring portion (that is, the wound separator 12) is to the center of the separator roll 10.

The above configuration causes an electromagnetic wave 4 having been emitted from the center $2b$ of the emitting surface $2a$ to (i) travel through not the separator 12 but the core 8 of a separator roll 10 and (ii) strike the detecting surface $3a$ of the sensor section 3. This prevents an emission line from showing in a captured image of a separator 12.

X rays are emitted radially from the center $2d$ of the focus $2c$ as the center. An electromagnetic wave 4 travels through the wound separator 12 in an oblique direction relative to the film surface of the separator 12 and strikes the detecting surface $3a$ of the sensor section 3. This prevents an emission line from showing in that portion of the captured image which corresponds to the image of the wound separator 12, and in turn prevents a false negative in defect detection without increasing the number of image-capturing operations.

In terms of prevention of an emission line, the radiation source section 2 may preferably have a focus $2c$ so positioned as not to face that portion of the corresponding side surface of a separator roll 10 held by the holding mechanism 20 which is not the wound separator 12, and may more preferably have a focus $2c$ so positioned as to face the corresponding side surface of the core 8, which is closer to the center of the separator roll 10 than the ring portion (that is, the wound separator 12) is to the center of the separator roll 10. This more reliably prevents an emission line from showing in a captured image of a separator 12.

The defect inspection device 1 is configured such that no structure is present, and only air is present, between the radiation source section 2 and a separator roll 10 held by the holding mechanism 20 and between a separator roll 10 held by the holding mechanism 20 and the detecting surface $3a$ of the sensor section 3.

The defect inspection device 1, which is configured as above, is capable of creating a clear captured image of a separator roll 10 as compared to a case in which a structure is present between a separator roll and a light-receiving surface of a sensor section. The defect inspection device 1 is thus capable of accurately inspecting a separator roll 10 for a defect inside the separator roll 10.

The defect inspection device 1 is, as an example, configured such that (i) the forward end of the holding mechanism 20, which extends in the X-axis direction, is inserted in the central hole $8a$ of the core of a separator roll 10 so that the holding mechanism 20 holds a central portion of the separator roll 10 and that (ii) the radiation source section 2 and the sensor section 3 face each other with the separator roll 10 therebetween.

The above configuration allows only a separator roll 10 as an inspection target to be present between the radiation source section 2 and the sensor section 3. This prevents something other than a separator roll 10 from showing in a captured image, thereby making it possible to create a captured image that facilitates defect inspection.

When the defect inspection device 1 is used to inspect a separator roll 10 for a defect inside the separator roll 10, the defect inspection device 1 may preferably be in a clean environment, for instance, be placed in a clean room. The clean environment may preferably have a class of, for example, not more than 100,000. Carrying out defect inspection in such an environment makes it possible to reduce the risk of a foreign object adhering to the separator roll 10 during or after the inspection. Further, the space surrounded by a wall containing, for example, lead which space may be inside or outside the defect inspection device 1 may preferably be also in a clean environment such as the above. With this configuration, the defect inspection device 1 is capable of accurately inspecting a separator 12, wound around a core, for a defect inside the separator 12.

It is preferable that no structure is present between a separator roll 10 and the detecting surface $3a$ of the sensor section 3. The defect inspection device 1 may, however, inspect a packaged separator roll 10 in the above clean environment.

Assuming as described above that the focus $2c$ and the second surface A2 of the separator roll 10 are separated from each other by a distance D1 and that the focus $2c$ and the detecting surface $3a$ of the sensor section 3 are separated from each other by a distance D2, the present specification defines D2/D1 as a measurement magnification.

The present invention has an object of creating a high-resolution X-ray image of an inspection target over its entire region within a short time. The time length necessary to inspect a separator roll 10 is given by the formula below. D2 needs to be set in such a manner as to minimize the time length.

(Exposure time period+Convey time)×Number of image-capturing operations  (Formula 1)

With D2/D1 fixed, multiplying D1 (that is, the distance between the focus $2c$ and the separator roll 10) by X results in $1/(X^2)$ as the dose per (time period·area) of the detecting surface $3a$. This indicates that in a case where D1 is multiplied by X, receiving the same dose at the detecting surface $3a$ requires the exposure time period to be proportional to $X^2$. Thus, in terms of the exposure time period, D1 is advantageously as small as possible. Decreasing D1, on the other hand, narrows the range over which the defect inspection device 1 is capable of capturing an image of a separator roll 10. This indicates that while decreasing D1 shortens the exposure time period, it increases (i) the number of image-capturing operations which number is necessary to cover the entire region and (ii) the number of movements between image-capturing operations, with the result of an increase of the time for defect inspection.

Decreasing D2 increases the resolution of a captured image of a separator roll 10 accordingly, but decreases the measurement magnification. This requires the sensor section 3 to have a high resolving power, that is, a sensor section (FPD) having a small pixel size. Increasing D2, on the other hand, reduces the constraint on the pixel size of the sensor section 3, but results in a larger sensor section or a larger defect inspection device, with the result of an increase in the space cost. Since an electromagnetic wave having a wavelength within a range of 1 μm to 10 nm is emitted radially by a radiation source, the size of a foreign object (detection target) as projected on the sensor section 3 is larger than the actual size of the foreign object. The pixel size of the sensor section 3 may be selected in view of how many pixels are to be used to detect a foreign object (detection target). In a case where, for instance, three or more pixels are to be used to detect a foreign object having a size of 100 μm, the pixel size may be selected with the lower limit being 100 μm÷3 ($\approx$33 μm).

In view of the above matters, D1 may preferably be not less than 1.5 times and not more than 4 times the width W, D2 may preferably be not less than 0.3 m and not more than 10 m, and D2/D1 may preferably be more than 1 and not more than 40. The sensor section (FPD) may preferably have a pixel size of not less than 20 μm and not more than 2000 μm. This configuration makes it possible to (i) shorten the time length necessary for defect inspection of a separator roll 10 and (ii) carry out the defect inspection accurately.

A single image-capturing operation may take a time period that is adjusted as appropriate on the basis of, for example, the time length necessary to inspect a single separator roll 10, the sensitivity of the sensor section 3, and/or the number of products to be processed (that is, the number of separator rolls 10 to be inspected) as long as the defect inspection device 1 is capable of capturing an image of a defect having a size targeted for detection.

Depending on, for example, the time length necessary to inspect a single separator roll 10, the sensitivity of the sensor section 3, and/or the number of products to be processed (that is, the number of separator rolls 10 to be inspected), the defect inspection device 1 may inspect a plurality of separator rolls 10 simultaneously by, for instance, (i) simultaneously capturing an image of a plurality of separator rolls 10 that are placed on top of one another in the X direction or (ii) simultaneously capturing an image of a plurality of separator rolls 10 arranged next to one another on the ZY plane.

(Method for Defect Inspection)

With reference to FIGS. 3 to 7, the description below deals with how the defect inspection device 1 carries out defect inspection.

Figure 4:
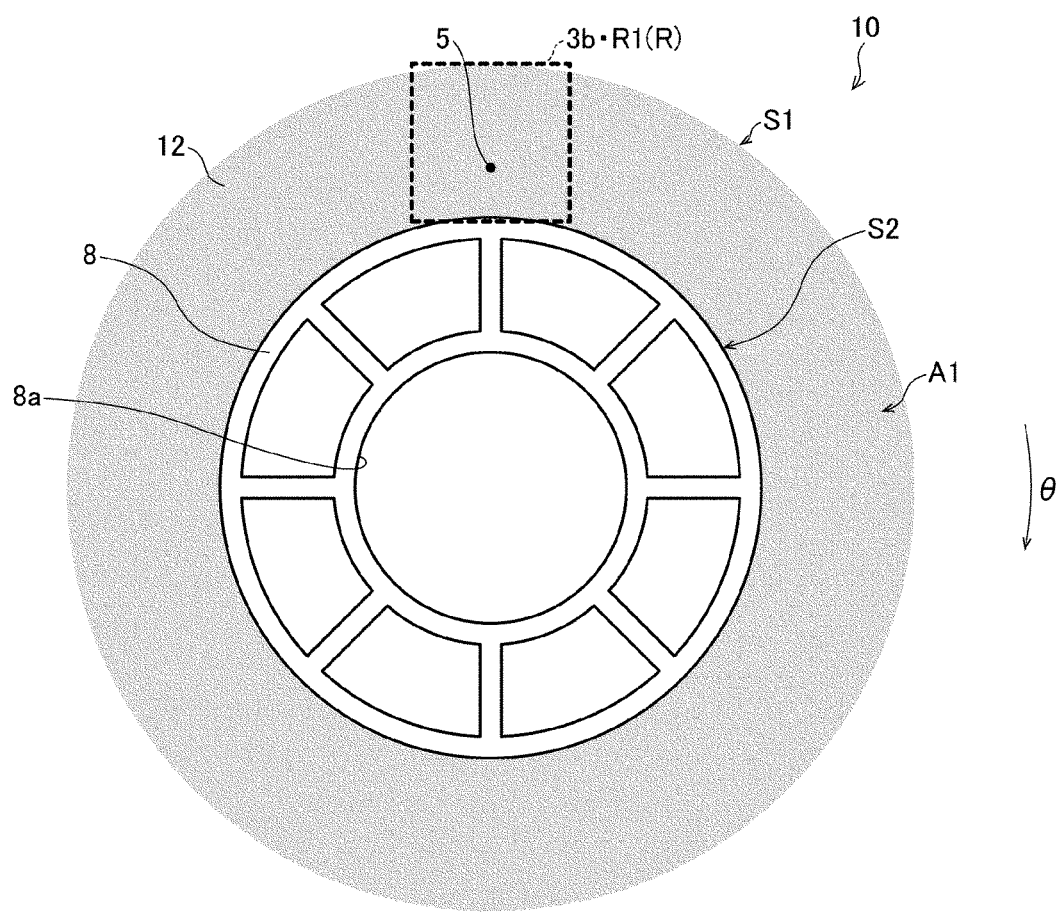
FIG. 4 is a diagram illustrating a captured image of a separator roll held by a holding mechanism of a defect inspection device in accordance with Embodiment 1 of the present invention.

FIG. 4 is a diagram illustrating a captured image of a separator roll 10 held by the holding mechanism 20. Although FIG. 4 illustrates a captured image of the entire separator roll 10, the defect inspection device 1 may capture an image of (i) only a target region 3b described later of the separator roll 10 or (ii) only a portion of the separator roll 10 which portion includes a target region 3b.

The sensor control section 33 sets a target region 3b in a captured image of a separator roll 10 to actually determine whether the separator roll 10 has any defect.

Depending on, for example, (i) the angle at which the electromagnetic wave 4 enters a separator roll 10 and/or (ii) the length of the path through which the electromagnetic wave 4 has traveled from the emitting surface 2a of the radiation source section 2 to the detecting surface 3a of the sensor section 3, the captured image includes a region in which a clear image is shown and a region in which an unclear image is shown. Using a region of a captured image in which region a clear image is shown makes it possible to reduce the number of false negatives in defect detection for accurate defect inspection.

In view of the above, the sensor control section 33 sets, as a target region 3b, a region of a captured image in which region a clear image is shown.

In a case where the defect inspection device 1 has captured an image of a range and position identical to those of a target region 3b, the defect inspection device 1 may use the captured image as a target region 3b.

The present embodiment is configured such that the sensor control section 33 sets, as a target region 3b, a quadrangular region including a portion of the outer peripheral surface S2 of the core 8 and a portion of the outer peripheral surface S1 of the separator 12. In other words, the target region 3b includes (i) a portion of the core 8 and (ii) a portion of the wound separator 12 over the full depth (the depth being the up-down direction of FIG. 4).

FIG. 3 shows a center line CE, which extends from the center 2b of the emitting surface 2a of the radiation source section 2 to the detecting surface 3a of the sensor section 3 in a direction perpendicular to the detecting surface 3a.

The target region 3b has a dimension in the up-down direction which dimension extends along the area of the sensor section 3 which area an electromagnetic wave 4a among other electromagnetic waves 4 strikes through a separator roll 10, the electromagnetic wave 4a being emitted radially with an angle B1 relative to the center line CE which angle B1 covers the outer peripheral surface S1 of the second side surface A2 of the separator roll 10.

The center line CE extends through the core 8 of the separator roll 10, the core 8 being closer to the center of the separator roll 10 than the separator 12 is to the center of the separator roll 10.

When the sensor control section 33 has set a target region 3b as illustrated in FIG. 4, the defect inspection device 1 captures an image of the separator roll 10 set therein.

The capturing of an image means the following operation: The radiation source section 2 emits an electromagnetic wave 4 in response to an instruction from the radiation source control section 31. The sensor section detects the electromagnetic wave 4 emitted by the radiation source section 2 and having passed through the separator roll 10, and outputs to the sensor control section 33 an electric signal corresponding to the intensity of the electromagnetic wave 4 detected. The sensor control section 33 receives such electric signals from the sensor section 3, and generates a captured image based on those electric signals.

Next, the sensor control section 33 extracts, from the captured image generated, a first region R1, which corresponds to the target region 3b.

FIG. 4 shows in the first region R1 a foreign object 5 as a defect to be detected. The foreign object 5 may be made of any of various materials such as metal and carbon. The foreign object 5 to be detected may have any of various sizes. The foreign object 5 may be, as an example, 100 μm and have a thickness of approximately 50 μm. When the present specification specifies the size of a foreign object simply as, for example, "100 μm" without specifying it as the thickness or width, that dimension means the diameter of the circumscribed sphere of the foreign object.

The foreign object 5 as a defect to be detected tends to, in a case where it has a large specific gravity, be detectable even if it is small. Assuming that the defect to be detected is a metal foreign object, in a case where a metal having a specific gravity of approximately 6 is detectable with a size down to, for example, approximately 100 μm under a certain inspection condition, a metal having a specific gravity of approximately 2 is detectable with a size down to approximately 300 μm. The defect inspection device 1 may be configured such that the size of a foreign object 5 as a detection target is set as appropriate according to the kind (that is, specific gravity) of a metal foreign object as a detection target.

The defect inspection device 1 is capable of detecting a small foreign object 5 in a case where the defect inspection device 1 has extended the time for inspection by, for example, extending the exposure time period and/or carrying out a plurality of image-capturing operations for the same region of a separator roll 10. Thus, the relationship described above between the specific gravity of a metal foreign object as a detection target and its size assumes a fixed inspection time length.

As the respective specific gravities of typical metals, Fe has approximately 7.8, A1 has approximately 2.7, Zn has approximately 7.1, stainless steel has approximately 7.7, Cu has approximately 8.5, and brass has approximately 8.5. The metal material of a foreign object 5 is, however, not limited to these examples.

Figure 5:
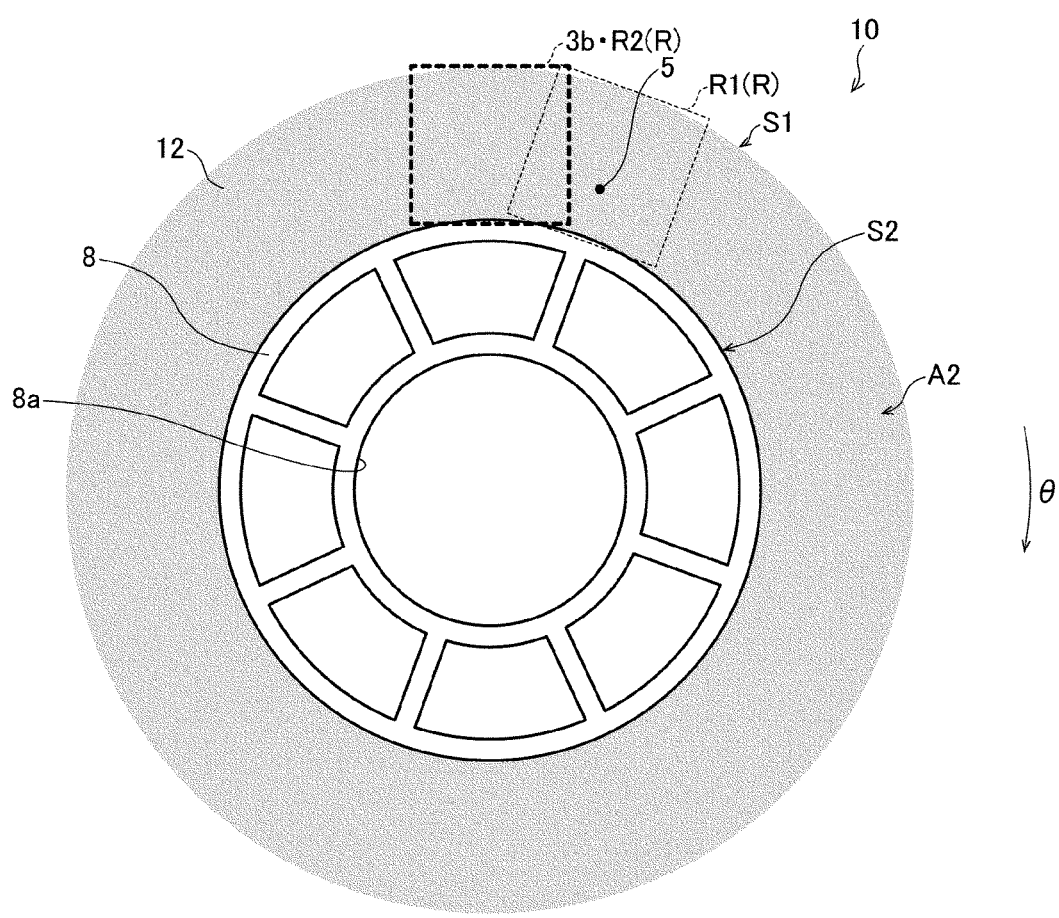
FIG. 5 is a diagram illustrating the separator roll of FIG. 4 as has been rotated in the θ direction by a predetermined angle.

FIG. 5 is a diagram illustrating the separator roll 10 of FIG. 4 as has been rotated in the θ direction by a predetermined angle.

After the sensor control section 33 has extracted, from a captured image, a first region R1 (which corresponds to a target region 3b), the holding mechanism control section 32 rotates the holding mechanism 20 in the θ direction by a predetermined angle as illustrated in FIG. 5. This causes the holding mechanism 20 and the separator roll 10 to (i) rotate in the θ direction by the predetermined angle and then (ii) stop. The present specification uses the term "region R" to refer to a region that the sensor control section 33 extracts from each captured image and that corresponds to the target region 3b.

The predetermined angle, by which the holding mechanism control section 32 causes the holding mechanism 20 and a separator roll 10 to rotate in the 0 direction, refers to an angle not larger than the angle with which (i) no uncaptured region is present on the first side surface A1 of the separator roll 10 when a plurality of regions R obtained by capturing images of the separator roll 10 while causing the holding mechanism 20 and the separator roll 10 to rotate by 360 degrees are so arranged as to overlap with each other and (ii) the number of images captured is the smallest.

The above configuration makes it possible to capture an image of the entire separator roll 10 efficiently. With the above configuration, the radiation source section 2 may preferably have an emitting surface 2a whose center 2b is so positioned as to face the sensor section 3. With this positioning, no uncaptured region being present on the first side surface A1 of a separator roll 10 means that no uncaptured region is present on the second side surface A2 as well. This makes it possible to capture an image of the entire separator roll 10 more suitably.

When the holding mechanism control section 32 has caused the holding mechanism 20 and the separator roll 10 to (i) rotate in the θ direction by a predetermined angle and then (ii) stop, the defect inspection device 1 captures an image of the separator roll 10 as rotated.

Next, the sensor control section 33 extracts, from the captured image generated, a second region R2, which corresponds to the target region 3b.

The second region R2 and the first region R1 as rotated overlap with each other with no gap therebetween and are angled differently from each other.

The operation is repeated of, as described above, (i) capturing an image, (ii) causing the separator roll 10 to rotate in the θ direction by a predetermined angle, and (iii) extracting a region after the rotation which region corresponds to the target region 3b.

Figure 6:
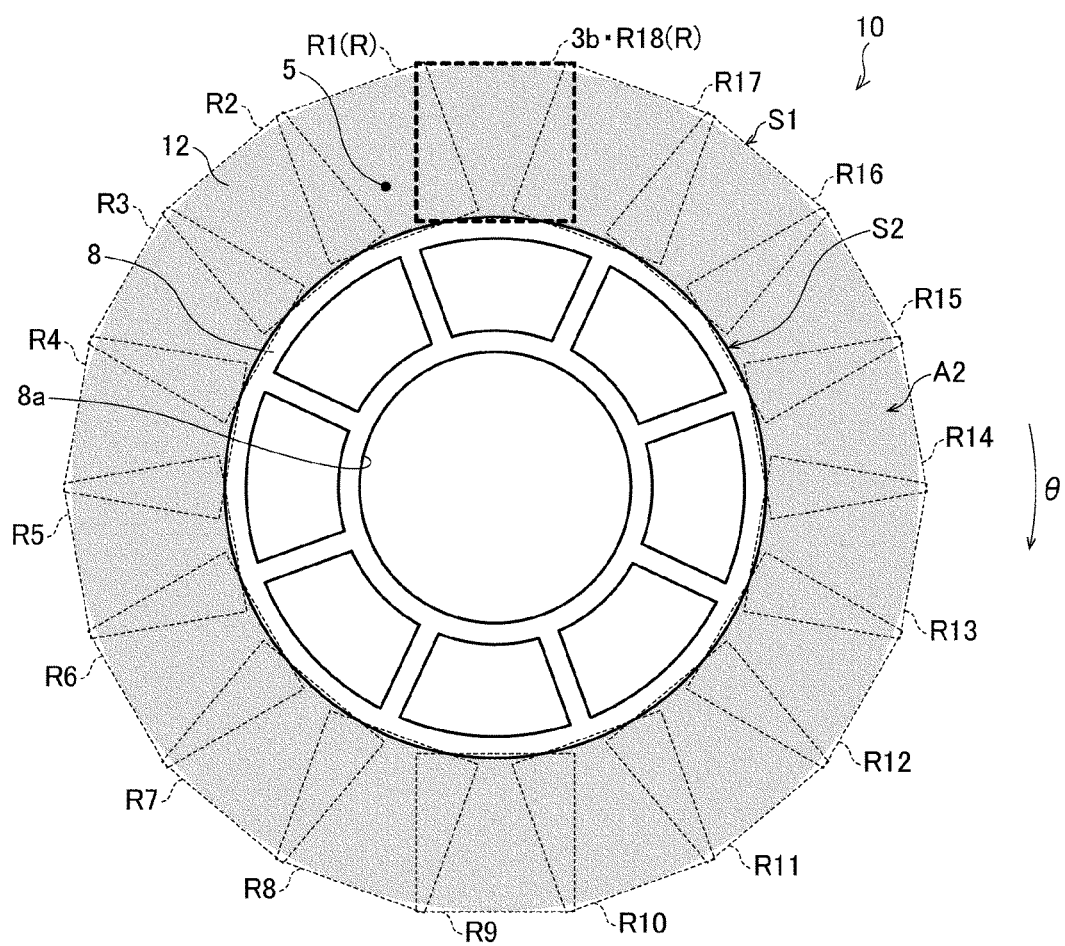
FIG. 6 is a diagram illustrating a defect inspection image of a separator roll in accordance with Embodiment 1 of the present invention.

FIG. 6 is a diagram illustrating a defect inspection image of a separator roll in accordance with Embodiment 1 of the present invention.

FIG. 6 illustrates a defect inspection image including a first region R1 through an eighteenth region R18, the defect inspection image being a combination of respective images of regions each of which corresponds to the target region 3b and is extracted from the entire circumference of the separator 12 having the shape of a ring. The separator 12 in the shape of a ring is shown in the combination of the first region R1 through the eighteenth region R18 (all the regions R).

The first region R1 through the eighteenth region R18 (all the regions R), which have been obtained by capturing images of the separator roll 10 while causing the holding mechanism 20 and the separator roll 10 to rotate by 360 degrees, have respective angles different from each other by a predetermined angle, which is not larger than the angle with which (i) no uncaptured region is present on the first side surface A1 of the separator roll 10 when the regions R adjacent to each other are so arranged as to overlap with each other and (ii) the number of images captured is the smallest.

With the holding mechanism 20 rotating in the θ direction by a predetermined angle for each rotation as described above, the separator roll 10 is moved relative to the radiation source section 2 in such a manner that an image is obtained of the entire separator 12 wound around the core 8. This makes it possible to inspect the entire separator 12 for a defect.

The defect inspection device 1 may alternatively be configured such that the separator roll 10 is moved relative to the radiation source section 2 as the radiation source section 2 and the sensor section 3 are rotated in the θ direction by a predetermined angle for each rotation with the center of the separator roll 10 as the rotation center (the holding mechanism 20 is fixed).

The first region R1 through the eighteenth region R18 are arranged such that (i) no gap is present between adjacent regions and that (ii) the first region R1 through the eighteenth region R18 are angled differently from each other in such a manner that each overlapping portion has a minimum possible area.

The defect inspection device 1 is capable of generating a defect inspection image that combines images extracted of the entire separator 12 having the shape of a ring as described above.

The present embodiment is configured to generate a defect inspection image of the entire ring-shaped separator 12 by carrying out, eighteen times, the flow of (i) capturing an image, (ii) extracting a target region 3b from the captured image, and (iii) causing the separator roll 10 to rotate in the θ direction by a predetermined angle. The number of the repeated operations may be changed as appropriate.

The defect inspection device 1 may be configured to then cause the defect inspection image to be displayed by a display (not shown in the drawings). The defect inspection device 1 may also be configured to (i) for example, process the defect inspection image in order to determine whether there is any defect to be detected and (ii) notify the operator of the determination result.

As described above, the separator roll 10 is moved relative to the radiation source section 2, and the radiation source section 2 emits an electromagnetic wave 4 to the separator roll 10 before and after the relative movement.

The radiation source section 2 thus emits an electromagnetic wave 4 to a region of the separator roll 10 before the relative movement of the separator roll 10 and to a region of the separator roll 10 which region is different from the above region after the relative movement. This allows the sensor control section 33 to obtain a captured image of a region of the separator roll 10 before the relative movement of the separator roll 10 and a captured image of a region of the separator roll 10 which region is different from the above region after the relative movement.

The defect inspection device 1 may be configured such that the sensor section 3 switches between detecting and not detecting an electromagnetic wave 4, instead of the radiation source section 2 switching between emitting and not emitting an electromagnetic wave 4, through the movement of the separator roll 10 relative to the radiation source section 2. The defect inspection device 1 may, in other words, be configured such that while the radiation source section 2 constantly emits an electromagnetic wave 4, the sensor section 3 switches between detecting and not detecting an electromagnetic wave 4. This allows the sensor control section 33 to obtain respective captured images of different regions R in a manner similar to the case in which the radiation source section 2 emits an electromagnetic wave 4 fragmentarily. It is preferable that the sensor section 3 should switch between detecting and not detecting an electromagnetic wave 4 through the relative movement of the separator roll 10. Turning an X-ray source on and off frequently may cause a disadvantage such as emitted X rays being unstable and/or the X-ray source having a shorter life.

As described above, even in a case where the sensor section 3 has a small detecting surface 3a, the sensor control section 33 is capable of obtaining a captured image of a wide area of a separator roll 10. This in turn makes it possible to inspect a wide area of a separator roll 10 for a defect, and eliminates the need to spend a long time for defect inspection.

The radiation source section 2 emits an electromagnetic wave 4 to a separator roll 10 before and after the separator roll 10 is moved relative to the radiation source section 2. This configuration allows the sensor control section 33 to obtain a captured image of a separator roll 10 at rest. This in turn ensures a long exposure time period unlike in a case where an image is captured of a separator roll being moved, and thereby makes it possible to obtain a bright and clear captured image. The above configuration thus makes it possible to carry out defect inspection more accurately.

As described above, the defect inspection device 1 is capable of carrying out defect inspection accurately while preventing an increase of the time necessary for the defect inspection.

The separator roll 10 is rotated relative to the radiation source section 2 with the center of the separator roll 10 as the rotation center. The sensor control section 33 generates a captured image of such a separator roll 10.

The sensor control section 33 combines a captured image generated before the relative movement of the separator roll 10 with a captured image generated after the relative movement of the separator roll 10 in such a manner that the two images partially overlap with each other. This configuration makes it possible to create a captured image of a wide area of the separator roll 10 thoroughly. This in turn makes it possible to efficiently create a captured image of a wide region of a separator roll 10.

The sensor control section 33 may preferably cause captured images of a separator roll 10 to partially overlap with each other in such a manner as to, while a separator roll 10 is rotated relative to the radiation source section 2 with the center of the separator roll 10 as the rotation center, generate captured images of such a separator roll 10 and cause those captured images to partially overlap with each other. This configuration efficiently makes it possible to cause captured images to overlap with each other similarly.

The defect inspection device 1 may preferably be configured to obtain a captured image that also shows a portion of the core 8. This configuration makes it possible to create a captured image of a wide area of the separator roll 10 thoroughly, the wide area including the innermost portion (which is the closest to the core 8) of the separator 12 of the separator roll 10.

The defect inspection device 1 may preferably be configured to obtain a captured image that also shows a space outside the outer peripheral surface S1. This configuration makes it possible to create a captured image of a wide area of the separator roll 10 thoroughly, the wide area including the outermost portion (which corresponds to the outer peripheral surface S1) of the separator 12 of the separator roll 10.

The defect inspection device 1 uses the electromagnetic wave 4 as an electromagnetic wave that the radiation source section 2 emits. This configuration makes it relatively easy to check whether there is any defect inside a separator 12 wound around a core 8.

The defect inspection device 1 may be configured to capture a plurality of images of the same region of a separator roll 10 while changing the respective relative positions of the radiation source section 2 and the separator roll 10. Capturing a plurality of images (for example, two images) of the same region of a separator roll 10 while changing the respective angles of the radiation source section 2 and the separator roll 10 makes it possible to, for example, (i) specify the position of a foreign object in the separator roll 10 (that is, the TD position in the separator roll 10), (ii) specify the overall shape of a foreign object in the separator roll 10, and/or (iii) detect a thin foreign object.

The defect inspection device 1 may be configured to, when capturing a second image of the separator roll 10, capture an image of the entire separator roll 10 again or alternatively capture an image of only a necessary region of the separator roll 10. For instance, after the defect inspection device 1 captures an image of the entire separator roll 10 by a method described above with reference to FIGS. 4 to 6 or any method described later for Embodiment 2 and its subsequent embodiments, the defect inspection device 1 may (i) specify, from the captured image, a region of the separator roll 10 in which region a foreign object is contained or something that looks like a foreign object is shown and (ii) capture an image again of only that region of the separator roll 10.

In a case where a separator roll 10 contains a particularly small (thin) foreign object, capturing only one image of the separator roll 10 may not be sufficient to find the foreign object. Thus, in a case where a foreign object as an inspection target is particularly small (thin), the defect inspection device 1 may preferably capture a plurality of images of the entire separator roll 10 while changing the respective angles of the radiation source section 2 and the separator roll 10. This makes it possible to detect a small (thin) foreign object.

The defect inspection device 1 is capable of, on the basis of, for example, the time length necessary to inspect a single separator roll 10, the sensitivity of the sensor section 3, and/or the number of products to be processed (that is, the number of separator rolls 10 to be inspected), being set to detect a foreign object 5 having a size within a particular range.

For instance, setting the defect inspection device 1 to detect any foreign object 5 that is not less than 100 µm and using the defect inspection device 1 for defect inspection of a separator roll 10 makes it possible to select, from among various separator rolls 10 that are produced through a process of producing a separator roll 10 and that (possibly) contain foreign objects of various sizes, any separator roll 10 that contains a foreign object 5 that is not less than 100 µm.

Removing, during the production process, any separator roll 10 in which the defect inspection device 1 has detected a foreign object 5 that is not less than 100 µm makes it possible to select, from among various separator rolls 10 (possibly) contain foreign objects of various sizes, any separator roll 10 that contains only a small number of foreign objects 5 which are not less than 100 µm or that is free from any foreign object 5 which is not less than 100 µm.

Stated differently, including, in the process of producing a separator roll 10, a defect inspection step involving the use of the defect inspection device 1 makes it possible to produce, from among various separator rolls 10 (possibly) containing foreign objects of various sizes, a separator roll 10 that contains only a small number of foreign objects 5 which are not less than 100 µm or that is free from any foreign object 5 which is not less than 100 µm.

In particular, a separator roll 10 containing only a small number of foreign objects 5 that are not less than 100 µm has a low possibility that a foreign object 5 adhering to the separator 12 causes a failure.

Including, in the process of producing a separator roll 10, a defect inspection step involving the use of the defect inspection device 1 as described above makes it possible to produce a separator roll that has only a small number of defects such as entry of a foreign object 5.

The defect inspection step may, as described above, preferably be carried out after the slitting step and before the packaging step during the process of producing a separator roll 10. This configuration makes it possible to efficiently inspect a separator roll 10 for any foreign object 5 generated in the slitting step.

Including the defect inspection step in the process of producing a separator roll 10 eliminates the need to inspect a separator 12 for an adhering foreign object 5 after the step of packaging the separator roll 10, specifically during a production process of assembling a battery with use of the separator 12 wound around the core 8.

The control section 30 may preferably be configured to, after an image is captured of a separator roll 10 and before an image is captured of another separator roll 10 (that is, after the end of each image-capturing cycle), return each section moved for capturing an image of the separator roll 10 (such as the holding mechanism 20) to its initial state. This prevents an inspection failure, a redundant inspection, and a malfunction such as starting an image-capturing operation while the previous image-capturing operation has not finished. The control section 30 may preferably be configured to return each section to its initial state after the end of each image-capturing cycle as described above also for each defect inspection device described later of Embodiment 2 and its subsequent embodiments.

(Modifications)

Figure 25:
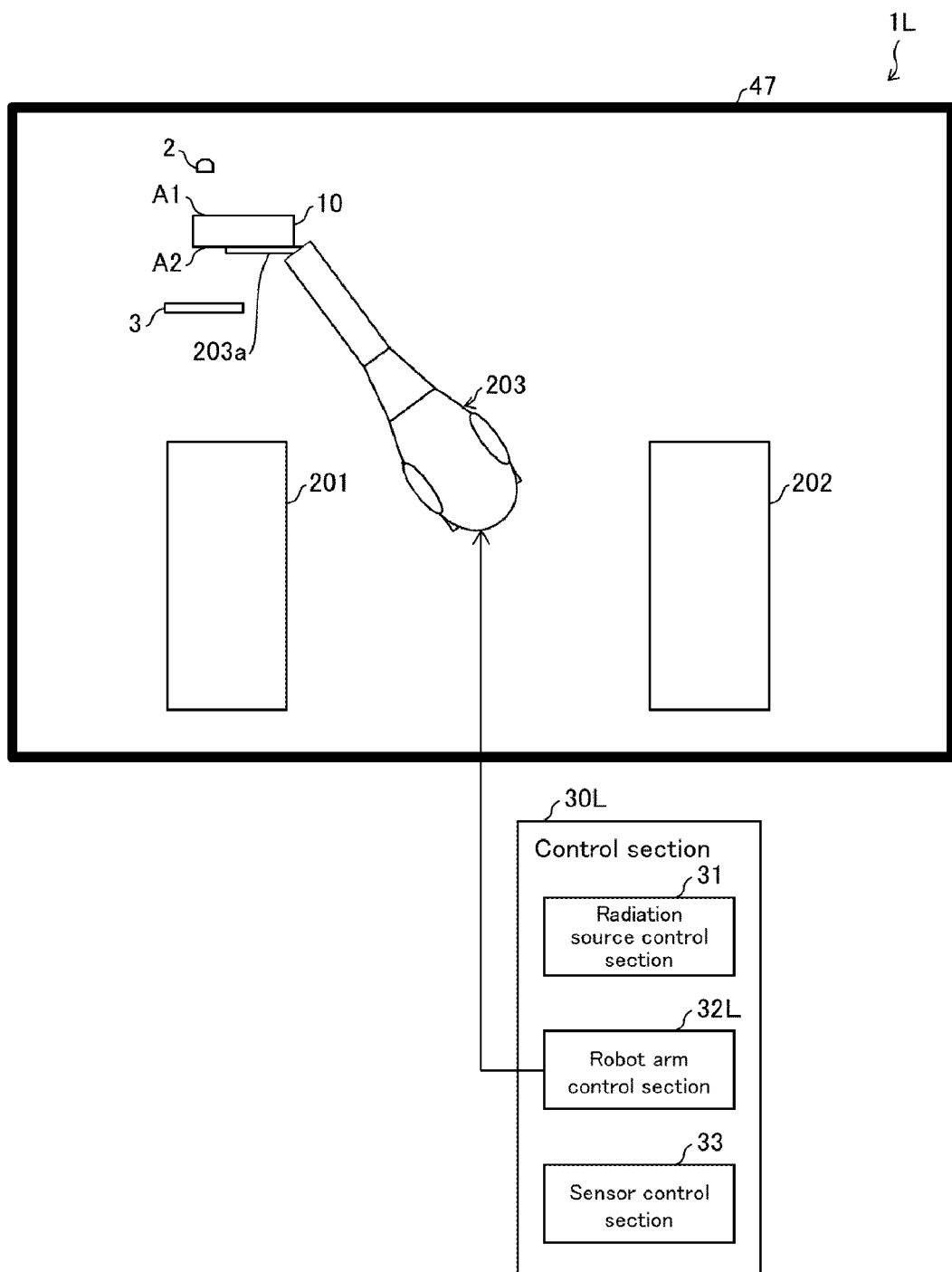
FIG. 25 is a diagram illustrating the configuration of a defect inspection device in accordance with a modification of Embodiment 1 of the present invention.

FIG. 25 is a diagram illustrating the configuration of a defect inspection device 1L in accordance with a modification of Embodiment 1 of the present invention.

FIG. 25 is a top view of a defect inspection device 1L in accordance with a modification of Embodiment 1 of the present invention, the view schematically illustrating the configuration of the defect inspection device 1L. As illustrated in FIG. 25, the defect inspection device 1L includes a radiation source section 2, a sensor section 3, a control section 30L, a wall 47, a pre-inspection rack 201, a post-inspection rack 202, and a robot arm (holding mechanism) 203. Since the robot arm 203 doubles as a holding mechanism 20 (see FIG. 3), the defect inspection device 1L does not include a separate holding mechanism 20.

The wall 47 has a surface containing, for example, lead to prevent an electromagnetic wave from passing therethrough easily so that the electromagnetic wave used does not leak outward. The wall 47 is provided with a door (not shown in FIG. 25), which is openable for a separator roll 10 to be carried in and out.

The control section 30L differs from the control section 30 in that the control section 30L includes a robot arm control section 32L in place of the holding mechanism control section 32 of control section 30. The control section 30L is otherwise similar in configuration to the control section 30. The robot arm control section 32L controls driving of the robot arm 203. The control section 30L may be positioned in the region surrounded by the wall 47 or outside that region.

The pre-inspection rack 201 is a member on which to place a separator roll 10 that has not been subjected to defect inspection in the defect inspection device 1L. The pre-inspection rack 201 includes a holding member, which can be inserted in the central hole 8a (see FIGS. 2a-2d) of the core 8 from the side of the first side surface A1 of the separator roll 10 to hold the separator roll 10. The post-inspection rack 202 is a member on which to place a separator roll 10 that has been subjected to defect inspection in the defect inspection device 1L. The post-inspection rack 202 includes a holding member, which can be inserted in the central hole 8a (see FIGS. 2a-2d) of the core 8 from the side of the first side surface A1 of the separator roll 10 to hold the separator roll 10.

The defect inspection device 1L does not necessarily include a pre-inspection rack 201 and a post-inspection rack 202 separately. The defect inspection device 1L may include a single rack that doubles as (i) a member on which to place a separator roll 10 that has not been subjected to defect inspection and (ii) a member on which to place a separator roll 10 that has been subjected to defect inspection. For instance, the single rack has two stages disposed on top of each other, and one of the upper and lower stages is used to place a separator roll 10 that has not been subjected to defect inspection, whereas the other of the upper and lower stages is used to place a separator roll 10 that has been subjected to defect inspection.

The robot arm 203 is configured to, in response to an instruction from the robot arm control section 32L, move a separator roll 10 between the pre-inspection rack 201 and the post-inspection rack 202. The robot arm 203 of the present embodiment doubles as a holding mechanism configured to hold a separator roll 10 being inspected for a defect by the defect inspection device 1L.

The robot arm 203 includes a forward end 203a configured to hold a separator roll 10. The forward end 203a is capable of (i) holding a separator roll 10 without coming into contact with the separator 12 by, for example, holding the core 8 of the separator roll 10 and (ii) causing the separator roll 10 that the forward end 203a is holding to rotate by a predetermined angle for each rotation.

The robot arm 203 holds the core 8 of a separator roll 10 on the pre-inspection rack 201 from the side of the second side surface A2 of the separator roll 10 and moves the separator roll 10 from the pre-inspection rack 201. The robot arm 203 positions and holds the separator roll 10, which has been moved from the pre-inspection rack 201, between the radiation source section 2 and the sensor section 3 in such an orientation that the first surface A1 faces the radiation source section 2 and that the second surface A2 faces the sensor section 3. The robot arm 203 is, at this stage, absent in that region of the separator roll 10 an image of which is to be captured. The defect inspection device 1L then inspects the separator roll 10 for a defect as described above with reference to FIGS. 3 to 7.

After the defect inspection, the robot arm 203 moves the separator roll 10 that the robot arm 203 is holding to the post-inspection rack 202.

The post-inspection rack 202 receives from the robot arm 203 the separator roll 10 that has been inspected. Specifically, the post-inspection rack 202 inserts its holding member (not shown in FIG. 25) into the central hole 8a (see FIG. 2) of the core 8 of the inspected separator roll 10 from the side of the first side surface A1 of the separator roll 10 to receive the separator roll 10.

The robot arm 203, the pre-inspection rack 201, and the post-inspection rack 202 move a separator roll 10 without coming into direct contact with the separator 12 as described above.

The robot arm 203 not only receives a separator roll 10 from the pre-inspection rack 201 and hands it to the post-inspection rack 202, but also serves as a holding mechanism (as with the holding mechanism 20) to hold a separator roll 10 being inspected for a defect.

The defect inspection device 1L may alternatively include two or more defect inspection units, each defect inspection unit including a radiation source section 2, a sensor section 3, a robot arm 203, a pre-inspection rack 201, and a post-inspection rack 202 all surrounded by the wall 47.

Embodiment 2

The description below deals with Embodiment 2 of the present invention mainly with reference to FIGS. 6 and 7. Note that for convenience of explanation, identical reference numerals are given to members which have respective functions identical with those described in Embodiment 1, and descriptions of the respective members are omitted.

Figure 7:
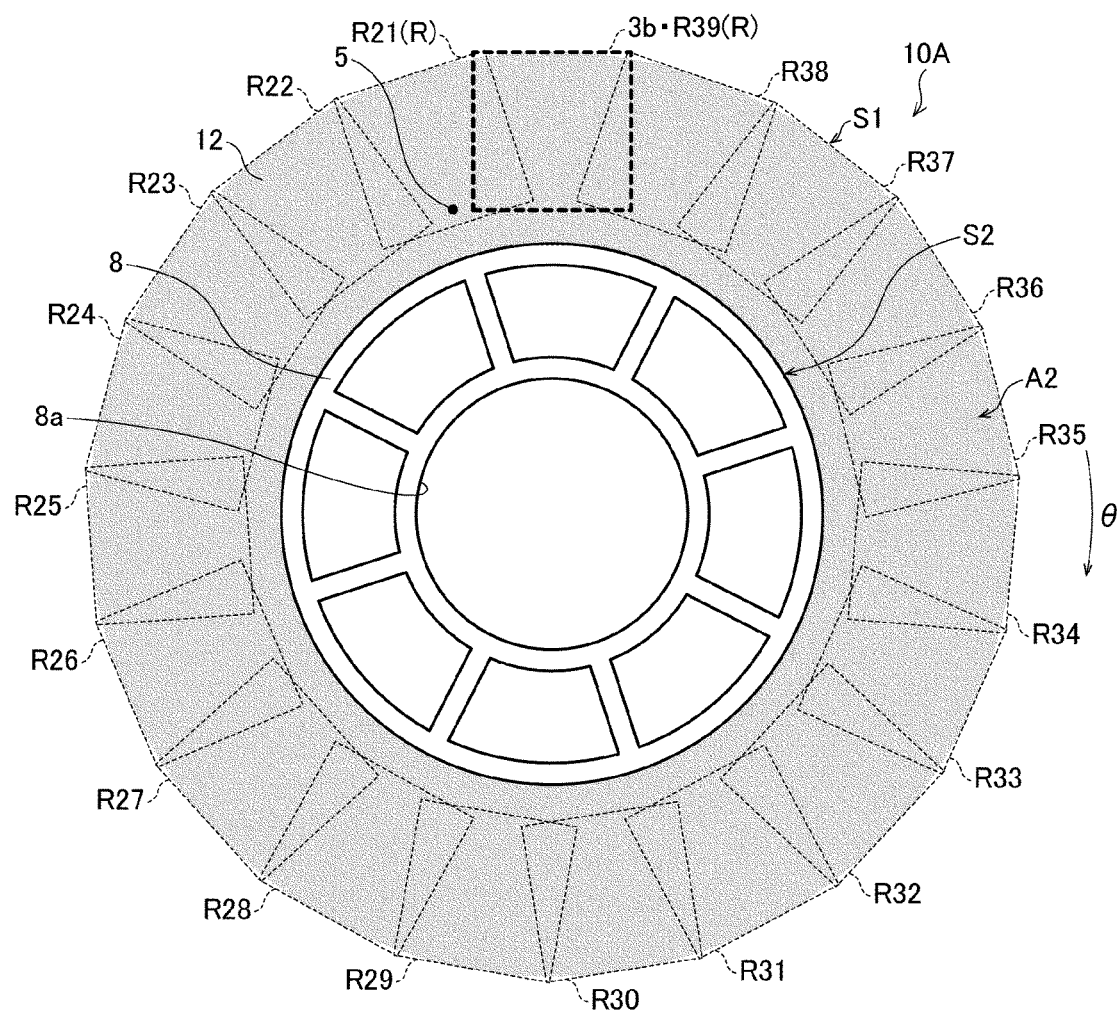
FIG. 7 is a diagram illustrating a defect inspection image of a separator roll in accordance with Embodiment 2 of the present invention.

FIG. 7 is a diagram illustrating a defect inspection image of a separator roll in accordance with Embodiment 2 of the present invention.

In a case where as with the separator roll 10A illustrated in FIG. 7, (i) a separator roll includes a ring-shaped separator 12 having a thickness larger than the thickness of a separator roll 10 (see FIG. 6), and (ii) the target region 3b cannot cover the full depth (radial direction) of the wound separator 12, the present embodiment captures a plurality of images of portions of the separator 12 which portions are next to each other in the thickness direction (radial direction).

In this case, the present embodiment first captures images of a first region R1 through an eighteenth region R18 on the inner peripheral side as illustrated in FIG. 6. The first region R1 through the eighteenth region R18 (regions R) show the outer peripheral surface S2 of the core 8 and have respective angles different from each other by a predetermined angle, which is not larger than the angle with which (i) no uncaptured region is present on the first side surface A1 of the separator roll 10 when the regions R adjacent to each other are so arranged as to overlap with each other and (ii) the number of images captured is the smallest.

Next, the holding mechanism control section 32 lowers the holding mechanism 20, holding the separator roll 10, in the negative Z direction (that is, downward in FIG. 3) over a predetermined distance. The predetermined distance, by which the holding mechanism control section 32 lowers the holding mechanism 20, is a distance that allows the target region 3b to (i) include a portion of the outer peripheral surface S1 of the separator 12 and (ii) overlap with any of the first region R1 through the eighteenth region R18.

The present embodiment, by carrying out, nineteen times, the flow of (i) capturing an image of the separator roll 10, (ii) extracting a target region 3b from the captured image, and (iii) causing the separator roll 10 to rotate in the θ direction by a predetermined angle, captures respective images of a first region R21 through a nineteenth region R39 on the outer peripheral side by a method similar to the method by which the present embodiment captures respective images of the first region R1 through the eighteenth region R18 on the inner peripheral side.

The first region R21 through the nineteenth region R39 (regions R) show the outer peripheral surface S1 of the separator 12 and have respective angles different from each other by a predetermined angle, which is not larger than the angle with which (i) no uncaptured region is present on the first side surface A1 of the separator roll 10 when the regions R adjacent to each other are so arranged as to overlap with each other and (ii) the number of images captured is the smallest.

The number of the repeated operations on the outer peripheral side is not limited to 19, and may be changed as appropriate.

Embodiment 3

The description below deals with Embodiment 3 of the present invention mainly with reference to FIGS. 8 and 9. Note that for convenience of explanation, identical reference numerals are given to members which have respective functions identical with those described in Embodiment 1 or 2, and descriptions of the respective members are omitted.

Figure 8:
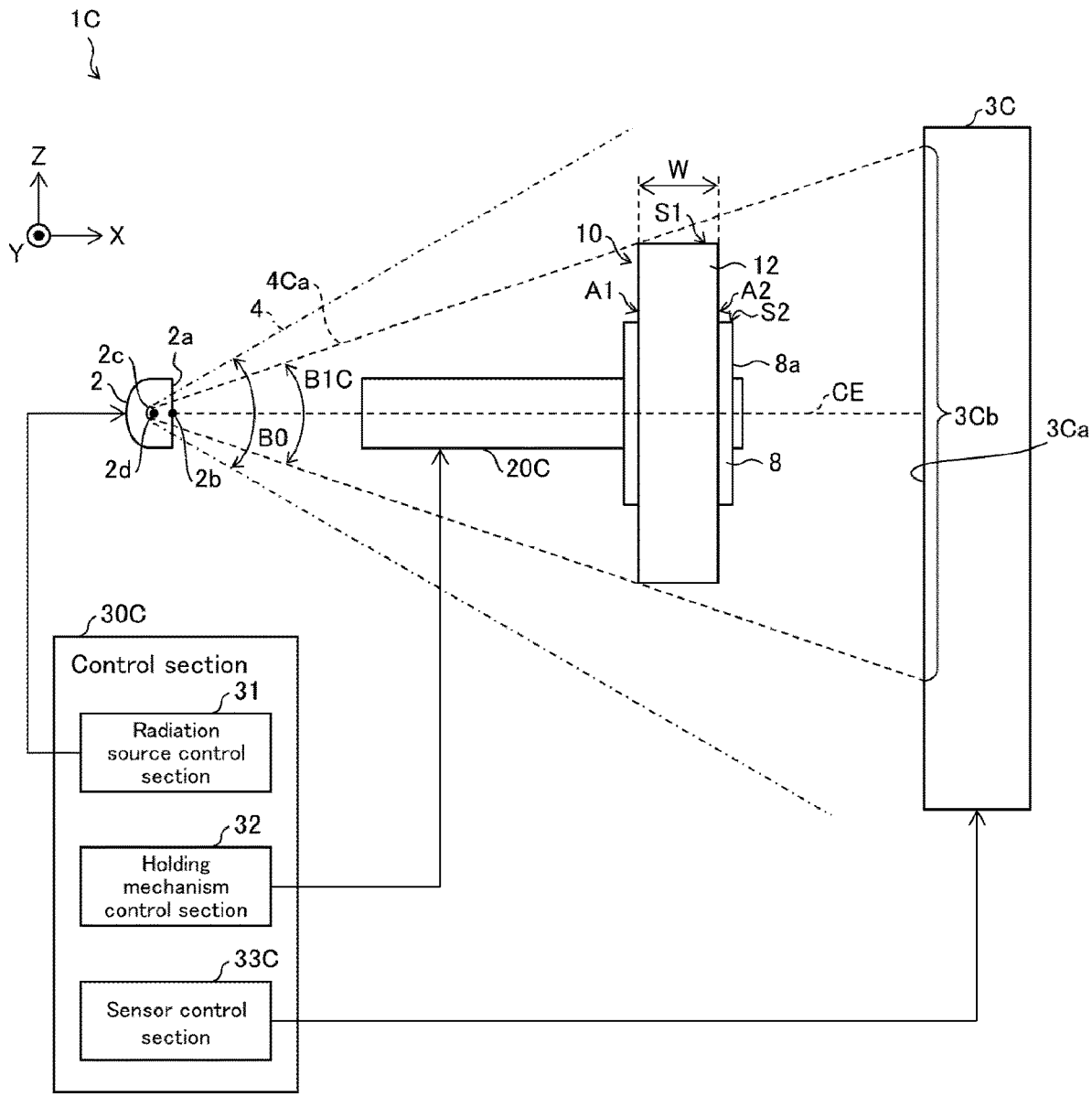
FIG. 8 is a diagram schematically illustrating the configuration of a defect inspection device in accordance with Embodiment 3 of the present invention.

FIG. 8 is a diagram schematically illustrating the configuration of a defect inspection device 1C in accordance with Embodiment 3 of the present invention.

The defect inspection device 1C includes a sensor section 3C, a holding mechanism 20C, and a control section 30C in place of the sensor section 3, the holding mechanism 20, and the control section 30 of the defect inspection device 1 (see FIG. 3).

The sensor section 3C is larger than the sensor section 3, and has a detecting surface 3Ca large enough to form an image of the entire separator roll 10. The sensor section 3C may be configured to include a plurality of sensor sections 3.

The holding mechanism 20C is identical to the holding mechanism 20 except that the holding mechanism 20C does not include a motor 22 configured to rotate in the θ direction. The holding mechanism 20C does not cause a separator roll 10 that the holding mechanism 20C is holding to rotate in the θ direction. This is because the holding mechanism 20C does not need to move (for example, rotate) a separator roll 10 in order to capture an image of the entire separator 12 of the separator roll 10, since the detecting surface 3Ca of the sensor section 3C is large enough to form an image of the entire separator roll 10.

The holding mechanism 20C is capable of, in response to an instruction from the holding mechanism control section 32, moving in the X-axis direction and the Z-axis direction. The holding mechanism 20C may be configured to be capable of moving also in the Y-axis direction, which is perpendicular to the X-axis direction and the Z-axis direction.

The radiation source section 2 is so positioned as to have an emitting surface 2a with a center line CE coinciding with the central axis of the holding mechanism 20C. This configuration allows (i) an electromagnetic wave 4 emitted by the radiation source section 2 to strike the separator roll 10 uniformly and (ii) the electromagnetic wave 4 having passed through the separator roll 10 to be detected by the sensor section 3C at the detecting surface 3Ca.

The sensor control section 33C is configured to generate a captured image of the entire separator roll 10 on the basis of electric signals obtained by the sensor section 3C detecting electromagnetic waves 4.

Figure 9:
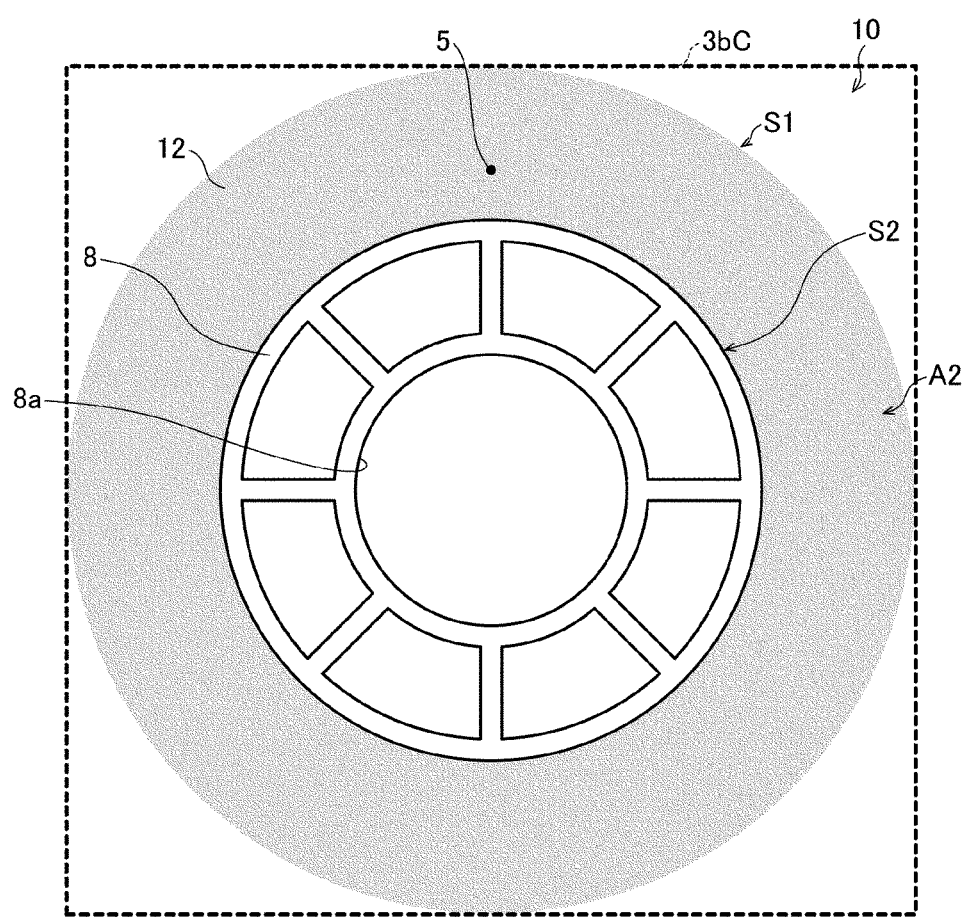
FIG. 9 is a diagram illustrating a defect inspection image of a separator roll in accordance with Embodiment 3 of the present invention.

FIG. 9 is a diagram illustrating a defect inspection image of a separator roll in accordance with Embodiment 3 of the present invention.

As illustrated in FIG. 9, the sensor control section 33C is configured to obtain a defect inspection image 3bC, which is obtained by removing an unnecessary portion of the captured image which unnecessary portion is present around the region corresponding to the separator roll 10.

The defect inspection image 3bC has a dimension in the up-down direction which dimension, as illustrated in FIG. 8, extends in the up-down direction along a detecting surface 3Cb (that is, a portion of the detecting surface 3Ca of the sensor section 3C) which detecting surface 3Cb an electromagnetic wave 4a among other electromagnetic waves 4 strikes through a separator roll 10, the electromagnetic wave 4a being emitted radially with an angle B1C with the center line CE as the center which angle B1C covers the outer peripheral surface S1 of the first side surface A1 of the separator roll 10.

Embodiment 4

The description below deals with Embodiment 4 of the present invention mainly with reference to FIGS. 10 to 13. Note that for convenience of explanation, identical reference numerals are given to members which have respective functions identical with those described in any of Embodiments 1 to 3 and descriptions of the respective members are omitted.

Figure 10:
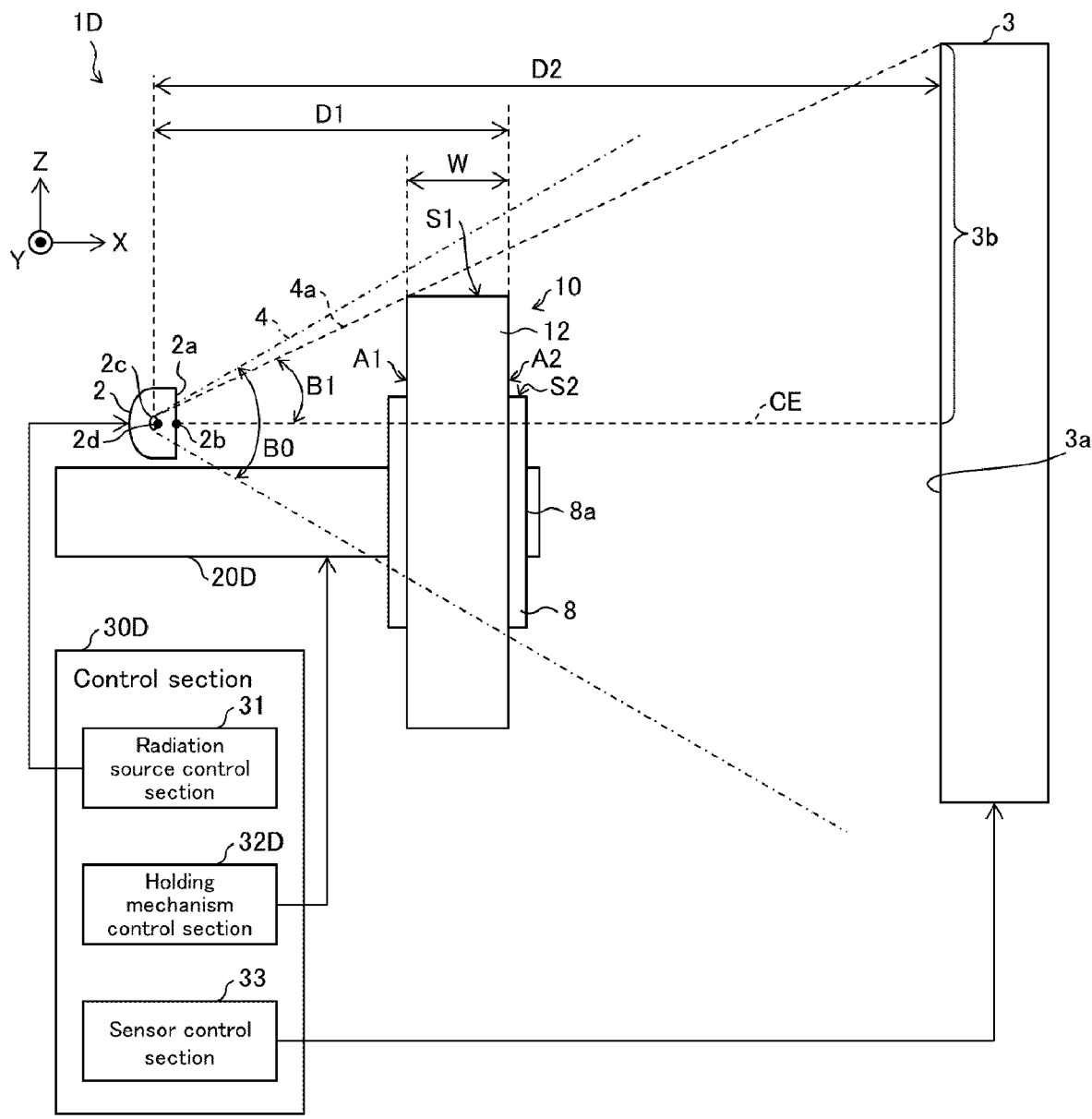
FIG. 10 is a diagram schematically illustrating the configuration of a defect inspection device in accordance with Embodiment 4 of the present invention.

FIG. 10 is a diagram schematically illustrating the configuration of a defect inspection device 1D in accordance with Embodiment 4 of the present invention.

The defect inspection device 1D differs from the defect inspection device 1 in that the defect inspection device 1D includes a holding mechanism 20D and a control section 30D in place of the holding mechanism 20 and the control section 30 of the defect inspection device 1 (see FIG. 3). The control section 30D differs from the control section 30 in that the control section 30D includes a holding mechanism control section 32D in place of the holding mechanism control section 32 of the control section 30. The defect inspection device 1D is otherwise similar in configuration to the defect inspection device 1.

The holding mechanism 20D is identical to the holding mechanism 20 except that the holding mechanism 20D does not include a motor 22 configured to rotate in the θ direction. The holding mechanism 20D does not cause a separator roll 10 that the holding mechanism 20D is holding to rotate in the θ direction. The holding mechanism 20D is capable of, in response to an instruction from the holding mechanism control section 32D, moving in the X-axis direction, the Z-axis direction, and the Y-axis direction, which is perpendicular to the X-axis direction and the Z-axis direction. The holding mechanism 20D of the present embodiment is configured to move a separator roll 10 in the Z direction and the Y direction without causing the separator roll 10 to rotate in the θ direction in order to move the separator roll 10 relative to the radiation source section 2.

Figure 11:
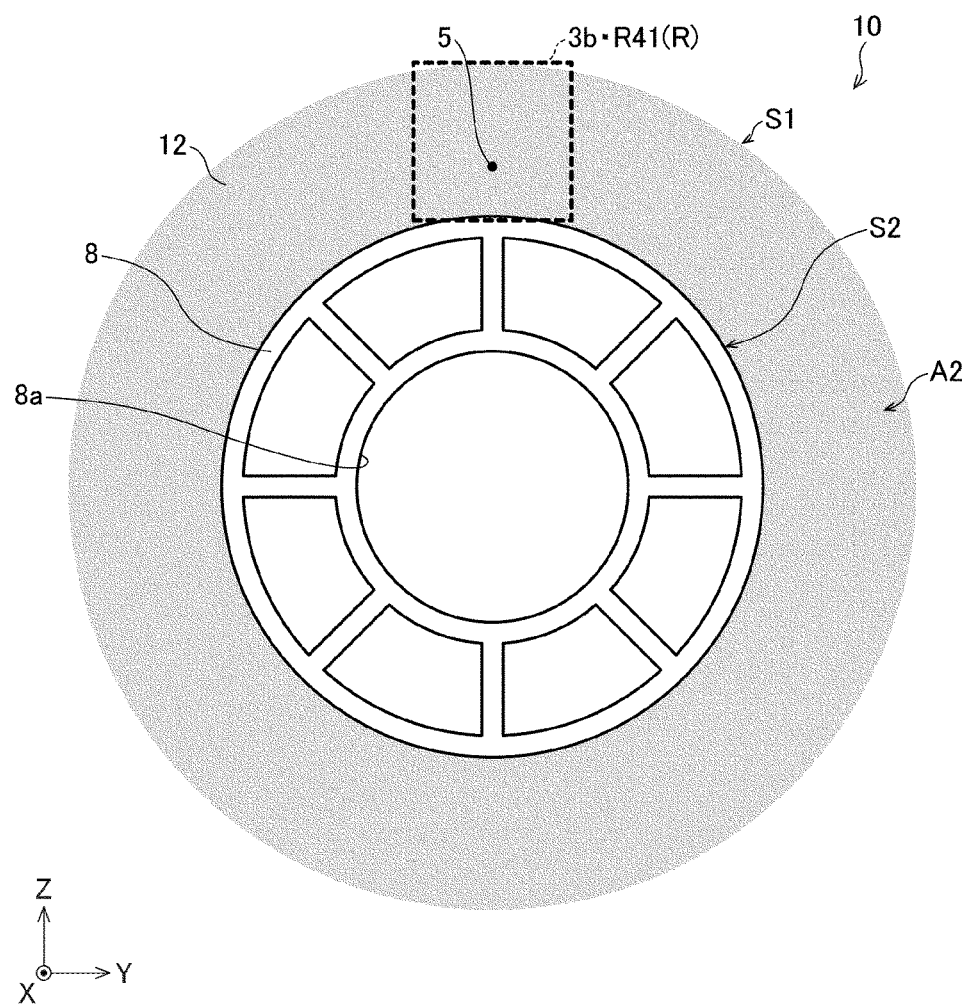
FIG. 11 is a diagram illustrating a captured image of a separator roll held by a holding mechanism of a defect inspection device in accordance with Embodiment 4 of the present invention.

FIG. 11 is a diagram illustrating a captured image of a separator roll 10 held by the holding mechanism 20D. Although FIG. 11 illustrates a captured image of the entire separator roll 10, the defect inspection device 1D may capture an image of (i) only a target region 3b of the separator roll 10 or (ii) only a portion of the separator roll 10 which portion includes a target region 3b.

The sensor control section 33 sets, as a target region 3b, a quadrangular region including a portion of the outer peripheral surface S2 of the core 8 and a portion of the outer peripheral surface S1 of the separator 12. In other words, the target region 3b includes (i) a portion of the core 8 and (ii) a portion of the wound separator 12 over the full depth (the depth being the up-down direction of FIG. 11).

When the sensor control section 33 has set a target region 3b, the defect inspection device 1D captures an image of the separator roll 10 set therein.

Next, the sensor control section 33 extracts, from the captured image generated, a first region R41, which corresponds to the target region 3b.

FIG. 11 shows in the first region R41 a foreign object 5 as a defect to be detected.

Figure 12:
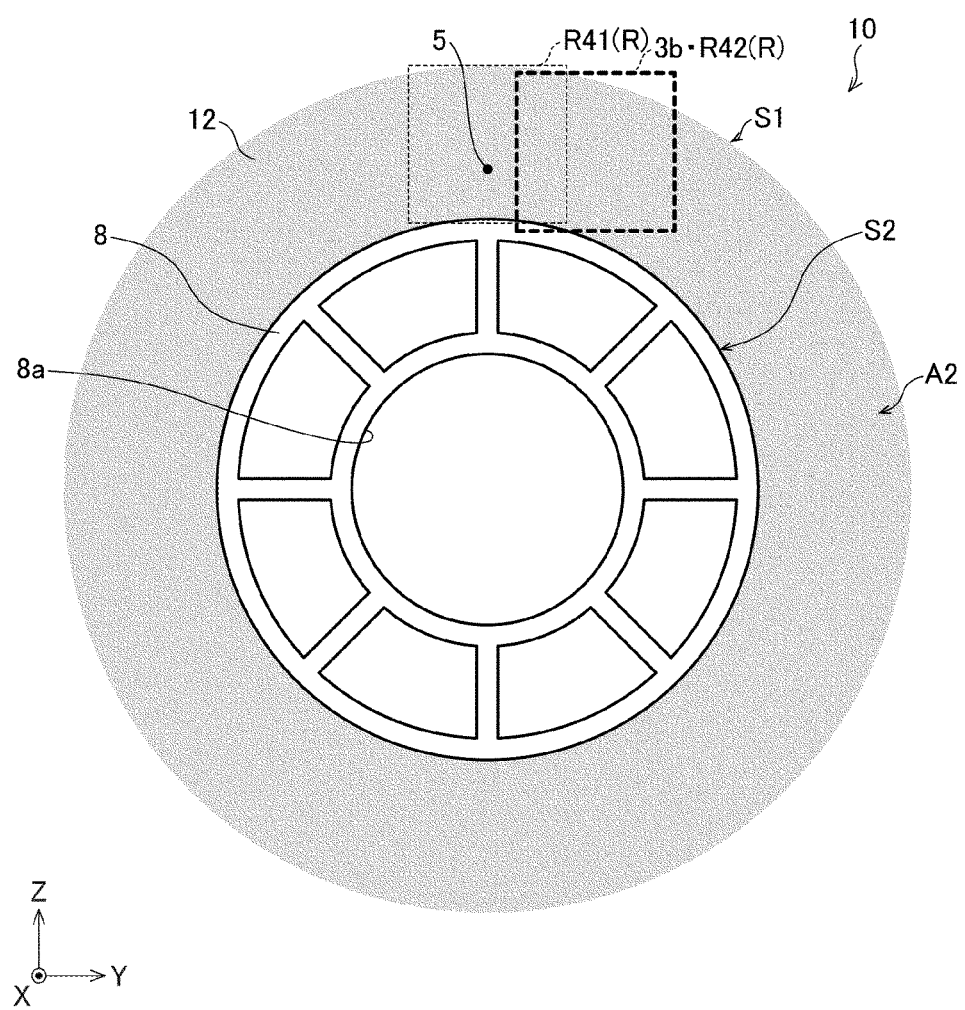
FIG. 12 is a diagram illustrating the separator roll of FIG. 11 as has been moved in the Y-axis direction and the Z-axis direction over a predetermined distance.

FIG. 12 is a diagram illustrating the separator roll 10 of FIG. 11 as has been moved in the Y-axis direction and the Z-axis direction over a predetermined distance.

After the sensor control section 33 has extracted, from a captured image, a first region R41 (which corresponds to a target region 3b), the holding mechanism control section 32D moves the holding mechanism 20D in the Y-axis direction and the Z-axis direction over a predetermined distance as illustrated in FIG. 12. This causes the holding mechanism 20D and the separator roll 10 to (i) move in the Y-axis direction and the Z-axis direction over the predetermined distance and then (ii) stop.

The predetermined distance, over which the holding mechanism control section 32D causes the holding mechanism 20D and a separator roll 10 to move in the Y-axis direction and the Z-axis direction, refers to a distance not larger than the distance with which (i) no uncaptured region is present on the first side surface A1 of the separator roll 10 when a plurality of regions R obtained by capturing images of the separator roll 10 while causing the holding mechanism 20 and the separator roll 10 to, not rotate in the θ direction, but move in the Y-axis direction and the Z-axis direction along the ring-shaped separator 12 are so arranged as to overlap with each other and (ii) the number of images captured is the smallest. The present embodiment is configured such that each region R shows a portion of the outer peripheral surface S1 and a portion of the outer peripheral surface S2. This configuration makes it possible to capture an image of the entire separator roll 10 efficiently.

When the holding mechanism control section 32D has caused the holding mechanism 20D and the separator roll 10 to (i) move in the Y-axis direction and the Z-axis direction over a predetermined distance and then (ii) stop, the defect inspection device 1D captures an image of the separator roll 10 as moved.

Next, the sensor control section 33 extracts, from the captured image generated, a second region R42, which corresponds to the target region 3b.

The second region R42 and the first region R41 as moved overlap with each other with no gap therebetween and are parallel to each other.

The operation is repeated of, as described above, (i) capturing an image, (ii) causing the separator roll 10 to move in the Y-axis direction and the Z-axis direction over a predetermined distance, and (iii) extracting a region after the movement which region corresponds to the target region 3b.

Figure 13:
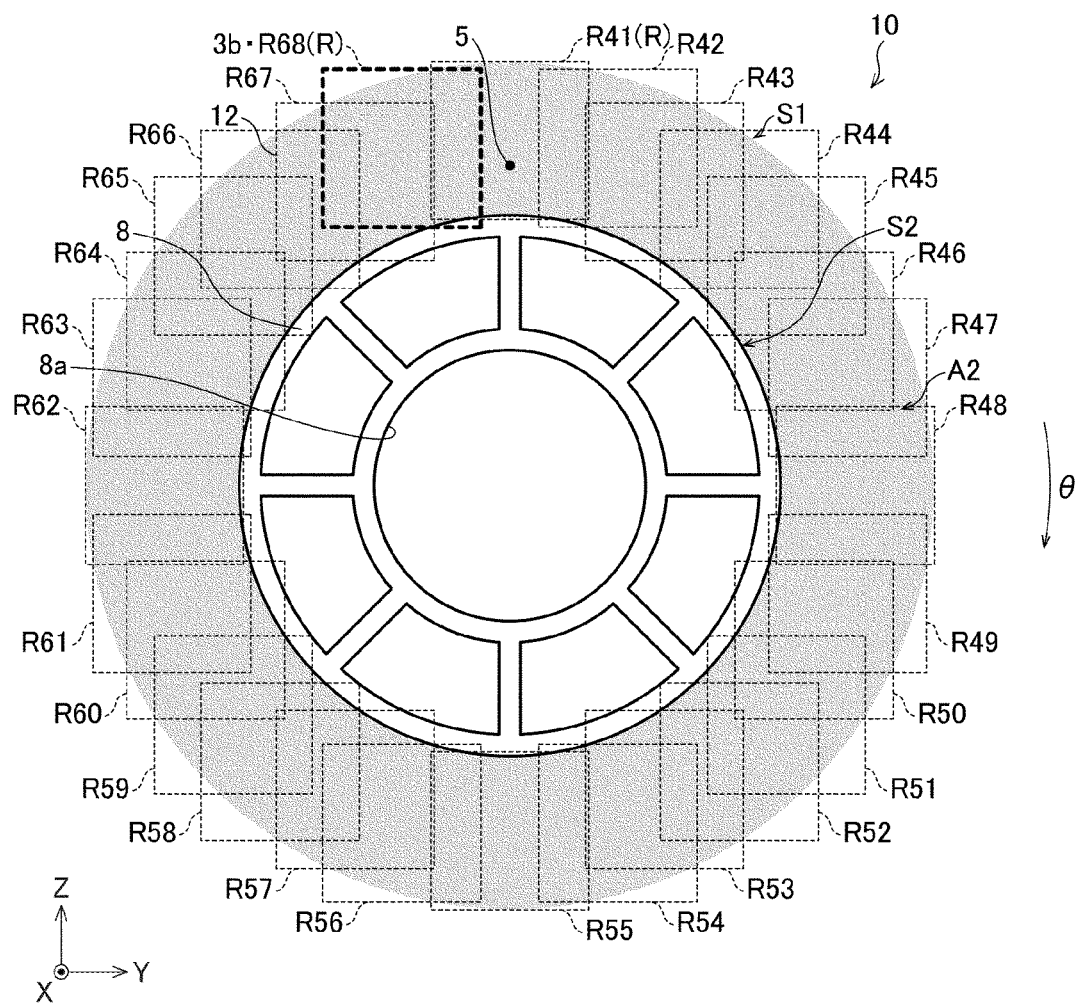
FIG. 13 is a diagram illustrating a defect inspection image of a separator roll in accordance with Embodiment 4 of the present invention.

FIG. 13 is a diagram illustrating a defect inspection image of a separator roll in accordance with Embodiment 4 of the present invention.

FIG. 13 illustrates a defect inspection image including a first region R41 through a twenty-seventh region R68, the defect inspection image being a combination of respective images of regions each of which corresponds to the target region 3b and is extracted from the entire circumference of the separator 12 having the shape of a ring. The separator 12 in the shape of a ring is shown in the combination of the first region R41 through the twenty-seventh region R68.

With the holding mechanism 20D moving in the Y-axis direction and the Z-axis direction over a predetermined distance for each movement as described above, the separator roll 10 is moved relative to the radiation source section 2 in such a manner that an image is obtained of the entire separator 12 wound around the core 8. This makes it possible to inspect the entire separator 12 for a defect.

The defect inspection device 1D may alternatively be configured such that the separator roll 10 is moved relative to the radiation source section 2 as the radiation source section 2 is moved in the Y-axis direction and the Z-axis direction over a predetermined distance for each movement (the holding mechanism 20D is fixed).

The first region R41 through the twenty-seventh region R68 (each region R), which have been obtained by capturing images of the separator roll 10 while causing the holding mechanism 20 and the separator roll 10 to, not rotate in the θ direction, but move in the Y-axis direction and the Z-axis direction along the ring-shaped separator 12, have respective positions different from each other by a predetermined distance, which is not larger than the distance with which (i) no uncaptured region is present on the first side surface A1 of the separator roll 10 when the regions R adjacent to each other are so arranged as to overlap with each other and (ii) the number of images captured is the smallest.

The defect inspection device 1D is capable of generating a defect inspection image that combines images extracted of the entire separator 12 having the shape of a ring as described above.

The present embodiment is configured to generate a defect inspection image of the entire ring-shaped separator 12 by carrying out, twenty-seven times, the flow of (i) capturing an image, (ii) extracting a target region 3b from the captured image, and (iii) causing the separator roll 10 to move in the Y-axis direction and the Z-axis direction over a predetermined distance. The number of the repeated operations may be changed as appropriate.

The defect inspection device 1D may be configured to then cause the defect inspection image to be displayed by a display (not shown in the drawings). The defect inspection device 1D may also be configured to (i) for example, process the defect inspection image in order to determine whether there is any defect to be detected and (ii) notify the operator of the determination result.

Embodiment 5

The description below deals with Embodiment 5 of the present invention mainly with reference to FIG. 16.

Note that for convenience of explanation, identical reference numerals are given to members which have respective functions identical with those described in any of Embodiments 1 to 4 and descriptions of the respective members are omitted.

Figure 16:
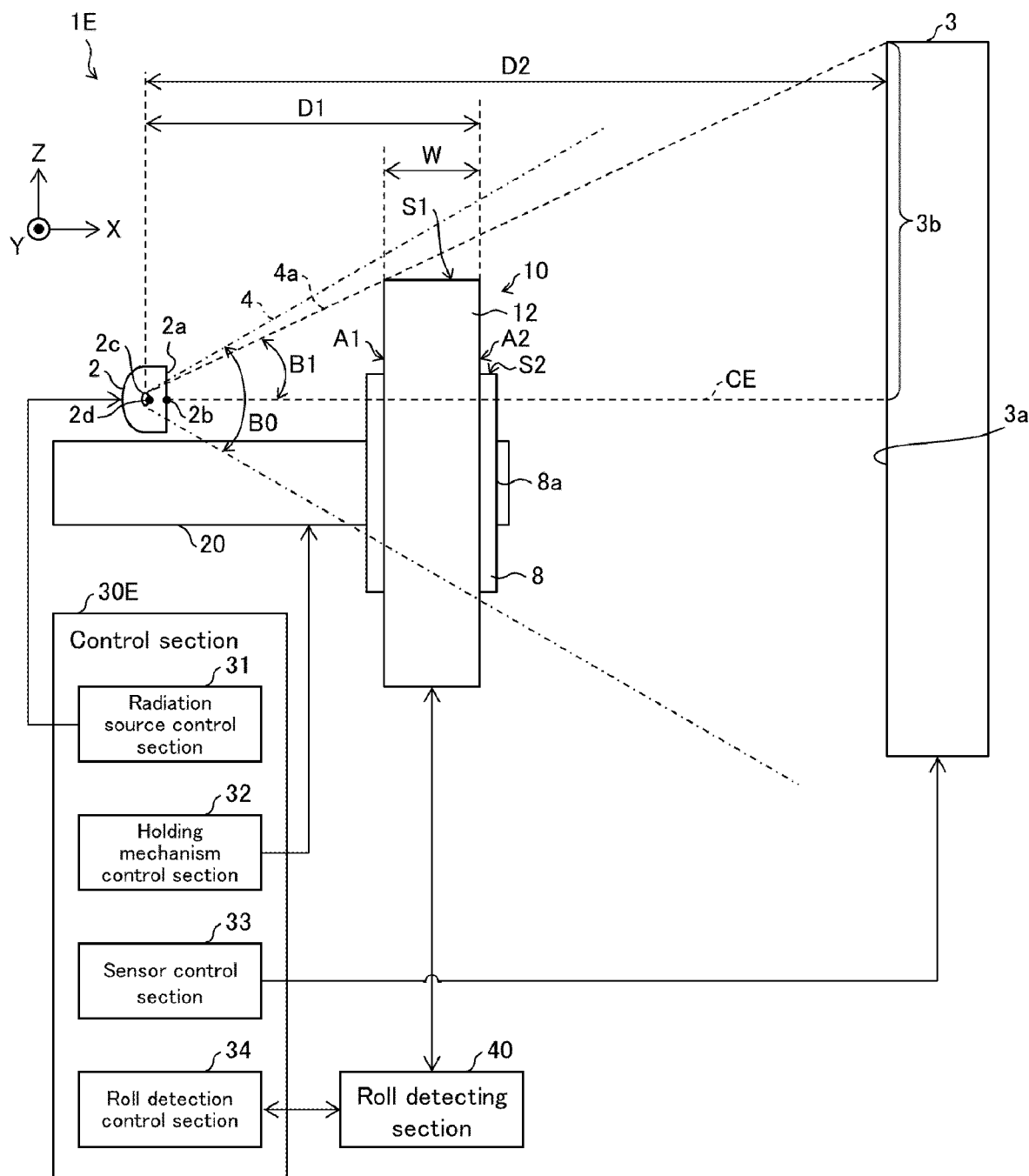
FIG. 16 is a diagram schematically illustrating the configuration of a defect inspection device in accordance with Embodiment 5 of the present invention.

FIG. 16 is a diagram schematically illustrating the configuration of a defect inspection device 1E in accordance with Embodiment 5 of the present invention.

The defect inspection device 1E illustrated in FIG. 16 includes a roll detecting section 40 and a roll detection control section 34 in addition to the members of the defect inspection device 1 (see FIG. 3).

The defect inspection device 1E includes a control section 30E, which includes the roll detection control section 34 in addition to the members of the control section 30 (see FIG. 3).

The roll detecting section 40, in response to an instruction from the roll detection control section 34, detects the position of a separator roll 10 in the defect inspection device 1E. The roll detecting section 40 outputs to the roll detection control section 34 detection information indicative of the position detected. The roll detection control section 34 determines on the basis of the detection information from the roll detecting section 40 whether a separator roll 10 has been disposed at a predetermined position in the defect inspection device 1E. The defect inspection device 1E may be configured to, for example, (i) cause a display (not shown in the drawings) to display the result of the detection by the roll detection control section 34 or (ii) notify the operator of the detection result with use of a sound or the like.

The above configuration prevents the defect inspection device 1E from idling.

If a defect inspection device inspects a separator roll 10 for a defect while the separator roll 10 is out of position in the defect inspection device, the separator roll 10 may have a region that was not inspected. The defect inspection device 1E prevents such a failure.

Further, if a defect inspection device inspects a separator roll 10 for a defect while the separator roll 10 is out of position in the defect inspection device, the separator roll 10 may come into contact with and break a movable part. The defect inspection device 1E prevents such a failure as well Embodiment 6

The description below deals with Embodiment 6 of the present invention mainly with reference to FIG. 17. Note that for convenience of explanation, identical reference numerals are given to members which have respective functions identical with those described in any of Embodiments 1 to 5 and descriptions of the respective members are omitted.

Figure 17:
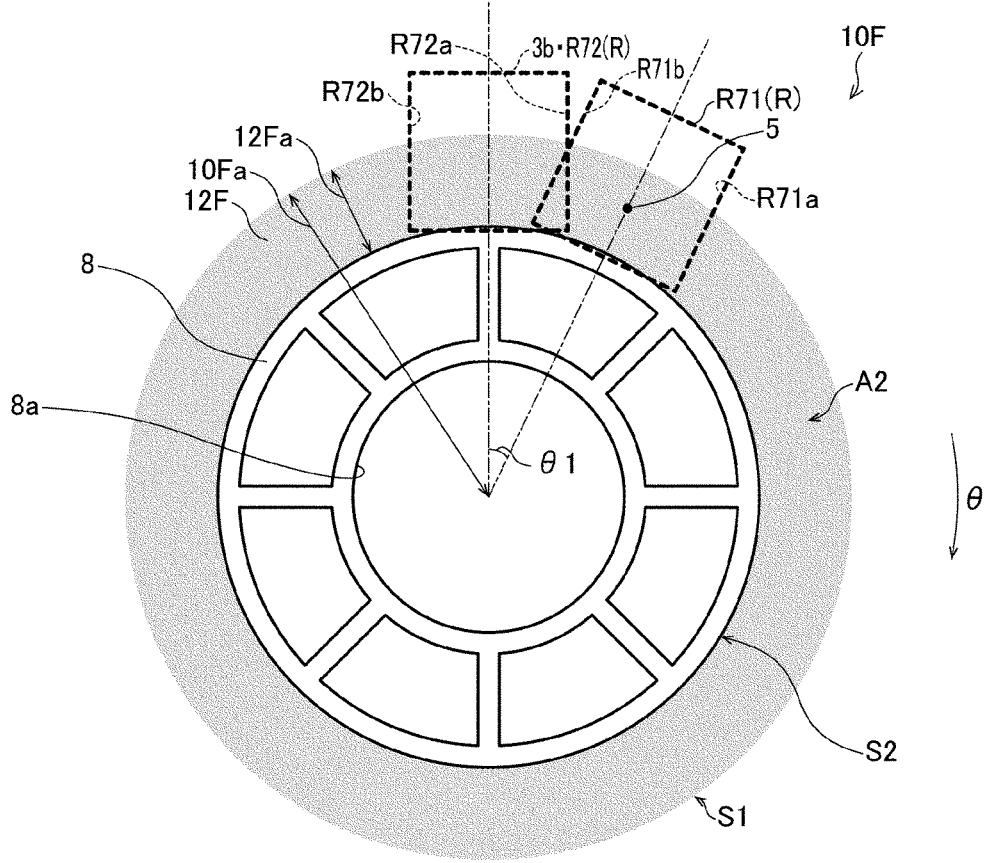
FIG. 17 is a diagram illustrating a defect inspection image of a separator roll in accordance with Embodiment 6 of the present invention.

FIG. 17 is a diagram illustrating a defect inspection image of a separator roll in accordance with Embodiment 6 of the present invention. The defect inspection device of the present embodiment is identical in configuration to the defect inspection device 1 of Embodiment 1 (see FIG. 3).

A separator roll that is set in the defect inspection device 1 may have a small radius 10Fa, that is, may include a separator 12F wound around a core 8 which separator 12F has a thickness 12Fa much smaller than a target region 3b, as with the separator roll 10F illustrated in FIG. 17.

In such a case, after the defect inspection device 1 has, in a first image-capturing operation, extracted a first region R71 corresponding to a target region 3b, the holding mechanism 20 causes the separator roll 10F to rotate in the θ direction by an angle θ1 larger than the angle described for Embodiment 1.

The angle θ1 is an angle that allows an intersection of a side R71b, a side R72a, and the outer peripheral surface S1 of a separator roll 10. The side R71b is (i) one of the opposite sides R71a and R71b of the first region R71 that are parallel to the radial direction of the separator roll 10 and (ii) upstream of the side R71a in the rotation direction. The side R72a is (i) one of the opposite sides R72a and R72b of a second region R72, which corresponds to a target region 3b of which an image is to be captured next, that are parallel to the radial direction of the separator roll 10 and (ii) downstream of the side R72b in the rotation direction.

The above configuration reduces the number of image-capturing operations necessary.

The present embodiment may be configured such that (i) the thickness 12Fa of the separator 12F of a separator roll 10F (that is, the outer diameter of a separator roll 10F) is detected manually or automatically and that (ii) the rotation angle is adjusted to an appropriate angle (angle θ1) depending on the thickness 12Fa. In a case where the outer diameter of a separator roll 10F is to be detected automatically, the sensor control section 33 may measure the outer diameter on the basis of a captured image from the sensor section 3, or the defect inspection device 1 may alternatively include a separate measuring mechanism configured to measure the outer dimensions of a separator roll 10F.

Embodiment 7

The description below deals with Embodiment 7 of the present invention mainly with reference to FIG. 18. Note that for convenience of explanation, identical reference numerals are given to members which have respective functions identical with those described in any of Embodiments 1 to 6 and descriptions of the respective members are omitted.

Figure 18:
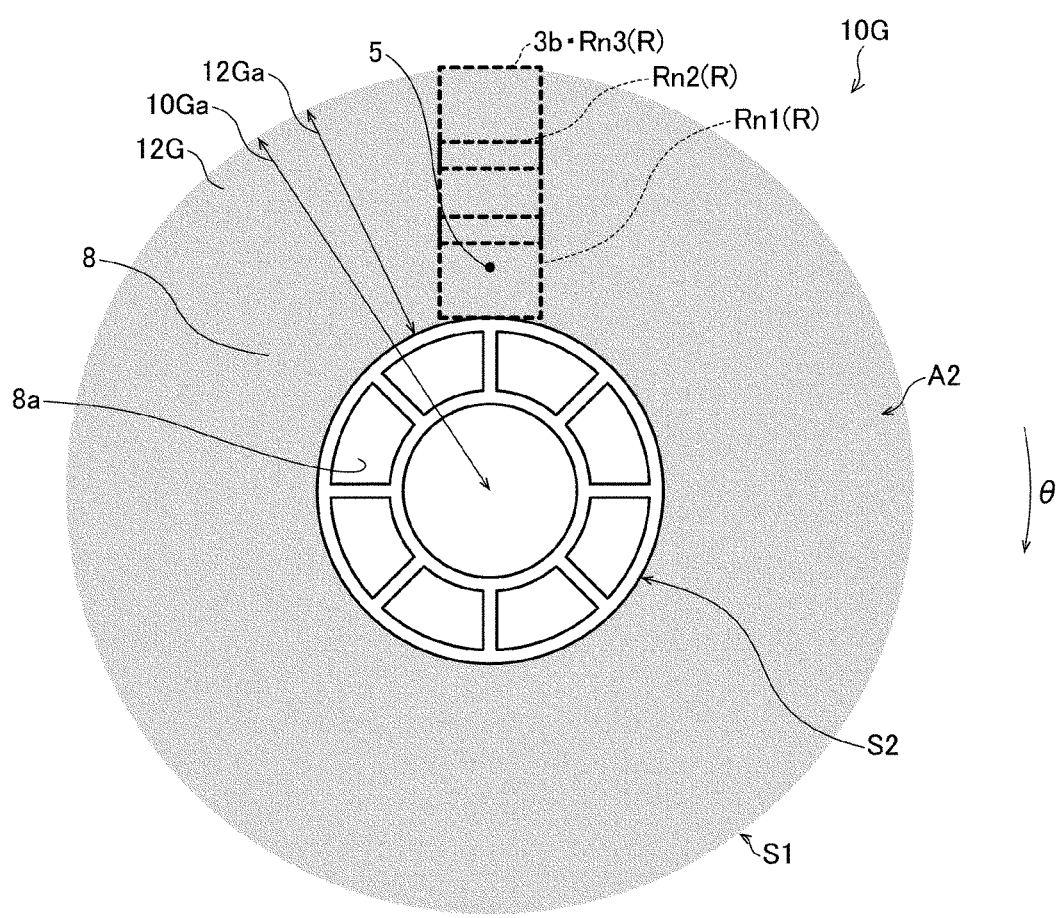
FIG. 18 is a diagram illustrating a defect inspection image of a separator roll in accordance with Embodiment 7 of the present invention.

FIG. 18 is a diagram illustrating a defect inspection image of a separator roll in accordance with Embodiment 7 of the present invention. The defect inspection device of the present embodiment is identical in configuration to the defect inspection device 1 of Embodiment 1 (see FIG. 3).

A separator roll that is set in the defect inspection device 1 may have a large radius 10Ga, that is, may include a separator 12G wound around a core 8 which separator 12G has a thickness 12Ga much larger than a target region 3b, as with the separator roll 10G illustrated in FIG. 18.

In a case where the target region 3b cannot cover the full depth (radial direction) of the wound separator 12G as described above, the present embodiment captures a plurality of images of portions of the separator 12G which portions are next to each other in the thickness direction (radial direction).

FIG. 18 illustrates a separator 12G having a thickness 12Ga that can be covered by three target regions 3b so arranged in the radial direction as to overlap with each other.

In this case, as described for Embodiment 1, the sensor control section 33 first captures images of a first round of regions Rn1 (each region R) that show the outer peripheral surface S2 of the core 8 and that have respective angles different from each other by a predetermined angle, which is not larger than the angle with which (i) no uncaptured region is present on the first side surface A1 of the separator roll 10G when the regions R adjacent to each other are so arranged as to overlap with each other and (ii) the number of images captured is the smallest.

Next, the holding mechanism control section 32 moves the separator roll 10G in the Z direction, and the sensor control section 33 captures images of a second round of regions Rn2 (each region R) that show only the separator 12G and that have respective angles different from each other by a predetermined angle, which is not larger than the angle with which (i) no uncaptured region is present on the first side surface A1 of the separator roll 10G when the regions R adjacent to each other are so arranged as to overlap with each other and (ii) the number of images captured is the smallest.

Next, the holding mechanism control section 32 moves the separator roll 10G further in the Z direction, and the sensor control section 33 captures images of a third round of regions Rn3 (each region R) that show the outer peripheral surface S1 of the separator 12G and that have respective angles different from each other by a predetermined angle, which is not larger than the angle with which (i) no uncaptured region is present on the first side surface A1 of the separator roll 10G when the regions R adjacent to each other are so arranged as to overlap with each other and (ii) the number of images captured is the smallest.

The above configuration makes it possible to capture an image of the entire region of a separator 12G.

Embodiment 8

The description below deals with Embodiment 8 of the present invention mainly with reference to FIGS. 19 to 21. Note that for convenience of explanation, identical reference numerals are given to members which have respective functions identical with those described in any of Embodiments 1 to 7 and descriptions of the respective members are omitted.

Figure 19:
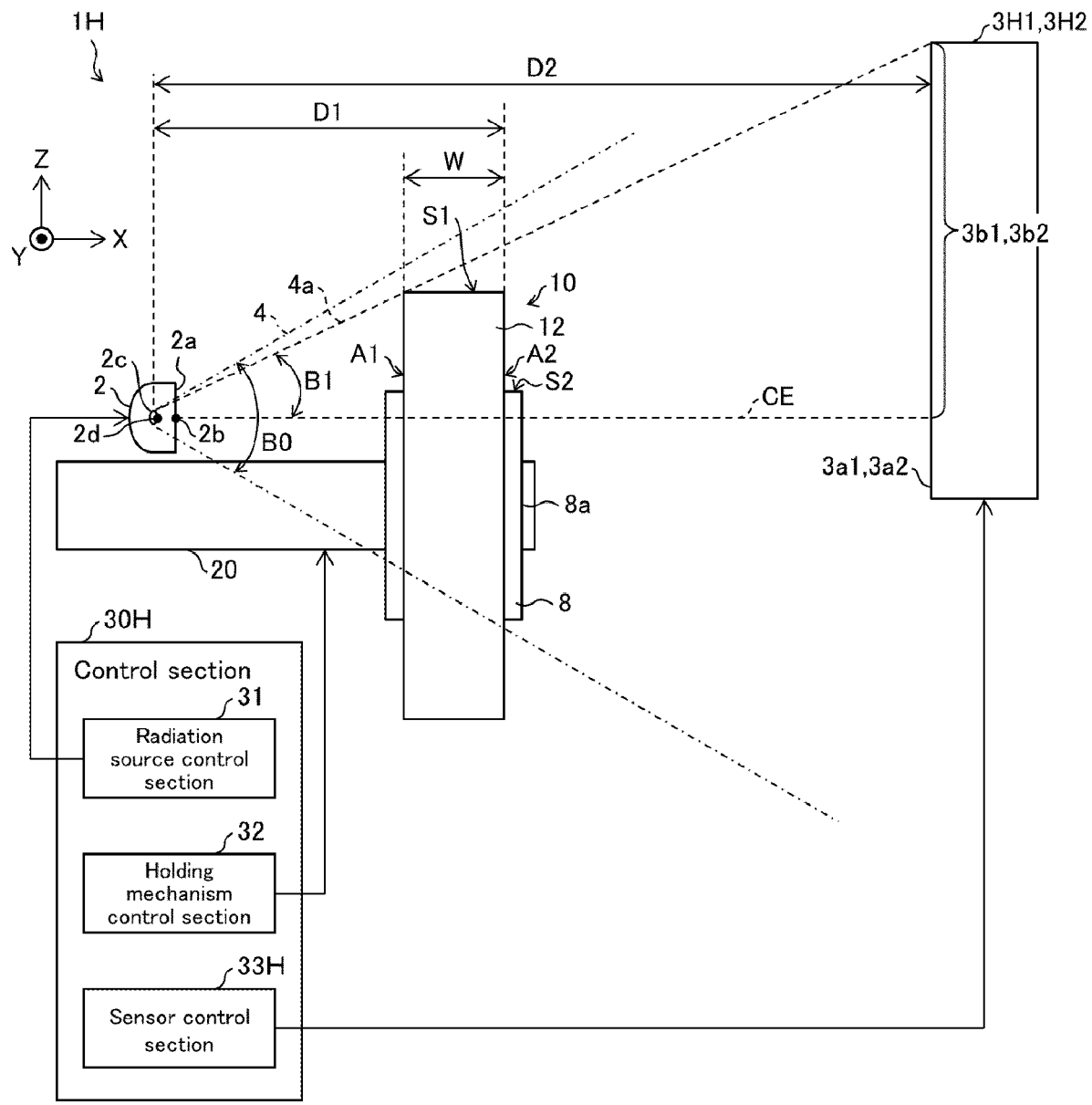
FIG. 19 is a diagram schematically illustrating the configuration of a defect inspection device in accordance with Embodiment 8 of the present invention.

FIG. 19 is a diagram schematically illustrating the configuration of a defect inspection device 1H in accordance with Embodiment 8 of the present invention.

The defect inspection device 1H illustrated in FIG. 19 includes sensor sections 3H1 and 3H2 and a control section 30H in place of the sensor section 3 and the control section 30 of the defect inspection device 1 (see FIG. 3). The control section 30H includes a sensor control section 33H in place of the sensor control section 33 of the control section 30. The defect inspection device 1H is otherwise similar in configuration to the defect inspection device 1.

The sensor control section 33H differs from the sensor control section 33 in that the sensor control section 33H controls driving of each of the two sensor sections 3H1 and 3H2.

The sensor sections 3H1 and 3H2 are disposed next to each other along the circumference of a separator roll 10, held by the holding mechanism 20, relative to the rotation center of the separator roll 10.

Figure 20:
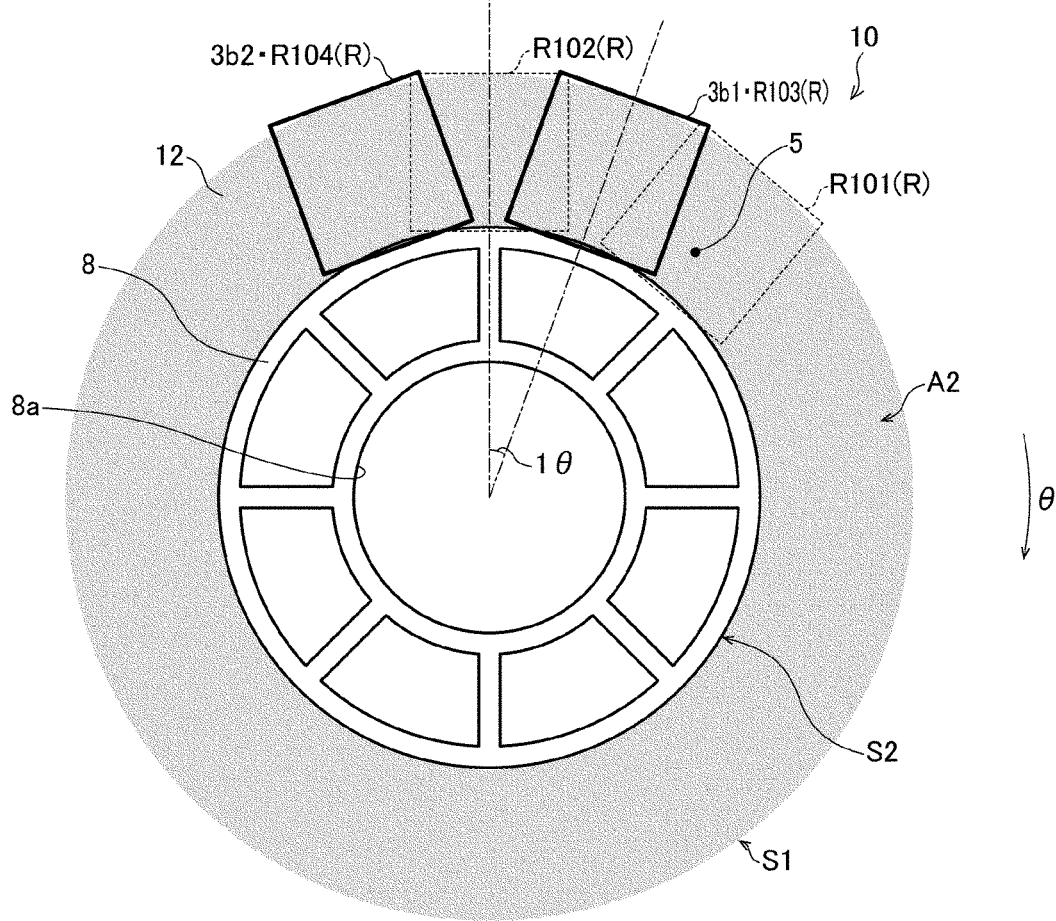
FIG. 20 is a diagram illustrating a captured image of a separator roll held by a holding mechanism of Embodiment 8 of the present invention.

FIG. 20 is a diagram illustrating a captured image of a separator roll 10 held by the holding mechanism 20 of the present embodiment.

The sensor control section 33H sets a target region 3b1 for the sensor section 3H1 and a target region 3b2 for the sensor section 3H2 as illustrated in FIG. 20. The defect inspection device 1H then captures an image of the separator roll 10 set therein. The sensor control section 33H then extracts, from the captured image generated, (i) a region R101 corresponding to the target region 3b1 and (ii) a region R102 corresponding to the target region 3b2.

The holding mechanism 20 then causes the separator roll 10 to rotate in the θ direction by a predetermined angle. During this step, the holding mechanism 20 causes the separator roll 10 to rotate by an angle 10 that allows the region R102 to overlap with the target region 3b1 and the target region 3b2 by an equal area.

The angle 10 is, stated differently, an angle by which to rotate a separator roll 10 so that a region R based on the target region 3b2 (which is one of the target regions 3b1 and 3b2 and which is upstream of the target region 3b1 in the rotation direction) will overlap with the target regions 3b1 and 3b2 by an equal area.

Next, the defect inspection device 1H captures an image of the separator roll 10 as has been rotated by the angle 10. The sensor control section 33H then extracts, from the captured image generated, (i) a region R103 corresponding to the target region 3b1 and (ii) a region R104 corresponding to the target region 3b2.

Figure 21:
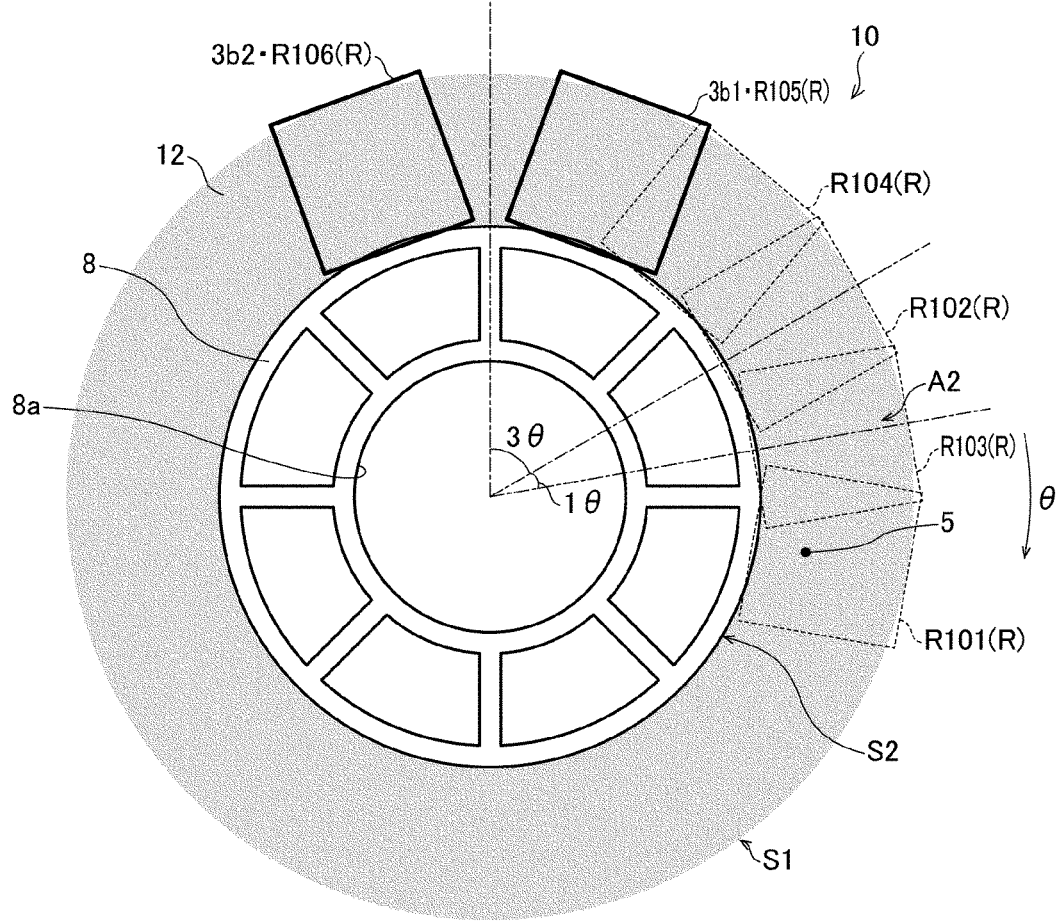
FIG. 21 is a diagram illustrating the separator roll of FIG. 20 as has been rotated by an angle 30.

FIG. 21 is a diagram illustrating the separator roll 10 of FIG. 20 as has been rotated by an angle 30.

Next, the holding mechanism 20 causes the separator roll 10 to rotate by an angle 30 to minimize the number of image-capturing operations necessary. The angle 30 is three times larger than the angle 10. The defect inspection device 1H then captures an image of the separator roll 10 as has been rotated by the angle 30. The sensor control section 33H then extracts, from the captured image generated, (i) a region R105 corresponding to the target region 3b1 and (ii) a region R106 corresponding to the target region 3b2. The region R105 overlaps with the adjacent region R104.

The defect inspection device 1H is capable of, as described above, capturing an image of the wound separator 12 in its entirety of a separator roll 10 while causing the separator roll 10 to rotate sequentially by the angles 10, 30, 10, 30, and so forth.

The defect inspection device 1H is capable of efficiently capturing an image of the entire separator 12 and of thereby efficiently inspecting the separator 12 for a defect.

The number of sensor sections in the defect inspection device 1H is not limited to two. The defect inspection device 1H may include three or more sensor sections that are disposed next to each other along the circumference of a separator roll 10, held by the holding mechanism 20, relative to the rotation center of the separator roll 10. This configuration further makes it possible to carry out defect inspection efficiently.

Embodiment 9

The description below deals with Embodiment 9 of the present invention mainly with reference to FIGS. 22 to 24. Note that for convenience of explanation, identical reference numerals are given to members which have respective functions identical with those described in any of Embodiments 1 to 8 and descriptions of the respective members are omitted.

Figure 22:
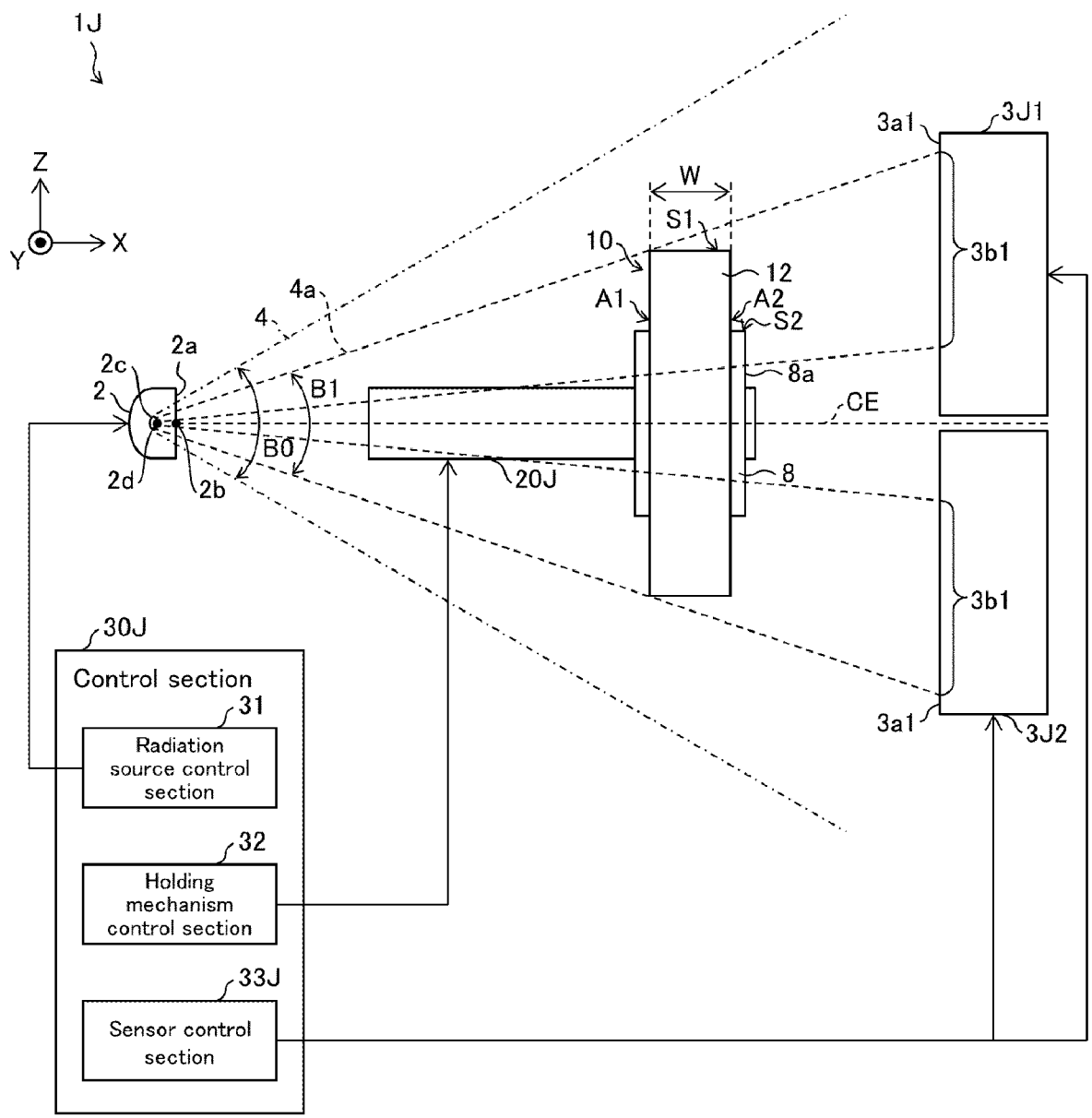
FIG. 22 is a diagram illustrating the configuration of a defect inspection device in accordance with Embodiment 9 of the present invention.

FIG. 22 is a diagram illustrating the configuration of a defect inspection device 1J in accordance with Embodiment 9 of the present invention. The defect inspection device 1J illustrated in FIG. 22 includes sensor sections 3J1 and 3J2 and a control section 30J in place of the sensor section 3C and the control section 30C of the defect inspection device 1C (see FIG. 8). The control section 30J differ from the control section 30C in that the control section 30J includes a sensor control section 33J in place of the sensor control section 33C of the control section 30C. The defect inspection device 1J is otherwise similar in configuration to the defect inspection device 1C. The sensor control section 33J controls driving of the two sensor sections 3J1 and 3J2.

The sensor sections 3J1 and 3J2 are disposed on top of each other, with the sensor section 3J1 and the sensor section 3J2 positioned above and below the rotation center of a separator roll 10 held by the holding mechanism 20J.

Figure 24:
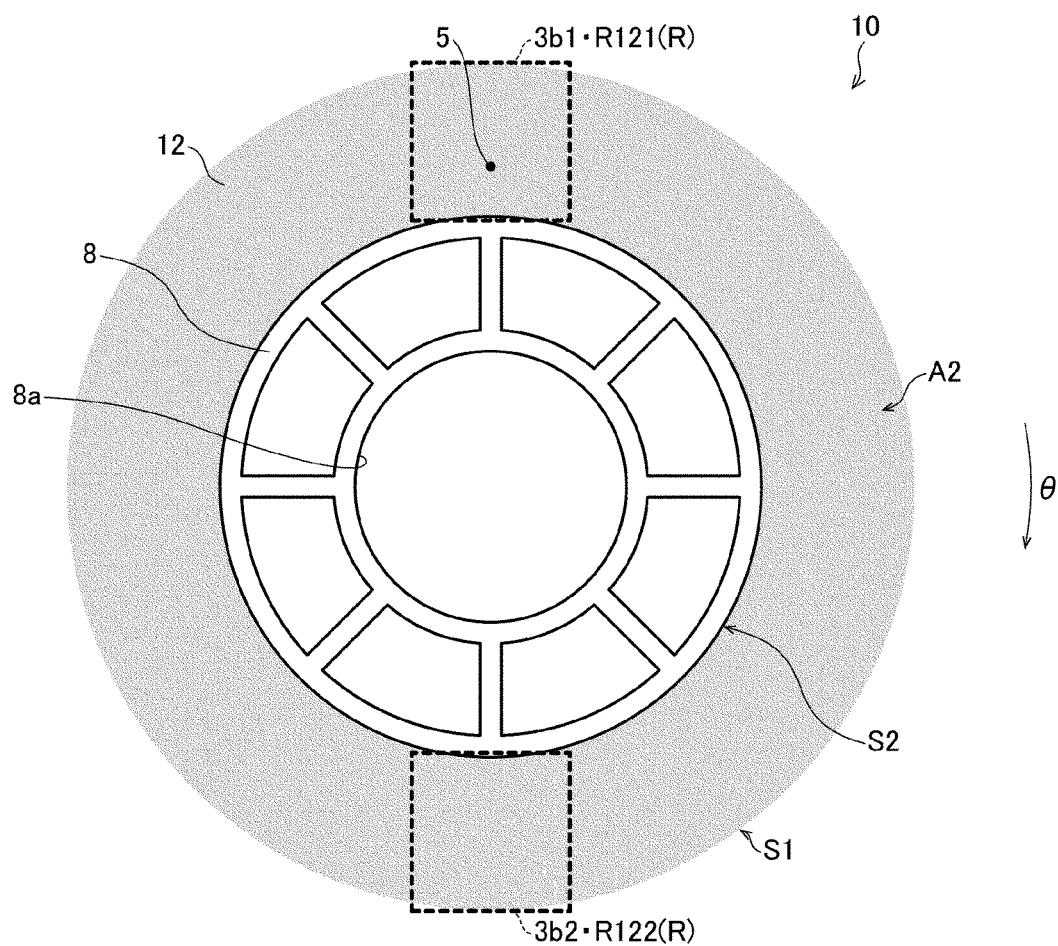
FIG. 24 is a diagram illustrating a defect inspection image of a separator roll in accordance with Embodiment 9 of the present invention.

FIG. 24 is a diagram illustrating a defect inspection image of a separator roll in accordance with Embodiment 9 of the present invention.

The sensor control section 33J sets a target region 3b1 for the sensor section 3J1 and a target region 3b2 for the sensor section 3J2 as illustrated in FIG. 24. The defect inspection device 1J then captures an image of the separator roll 10 set therein. The sensor control section 33J then extracts, from the captured image generated, (i) a region R101 (region R) corresponding to the target region 3b1 and (ii) a region R102 (region R) corresponding to the target region 3b2. This configuration makes it possible to capture images of two regions R in one image-capturing operation, and thus merely involves, not a full-circle rotation, but a half-circle rotation of a separator roll 10 to capture an image of the entire separator 12. This in turn makes it possible to carry out defect inspection efficiently.

Figure 23:
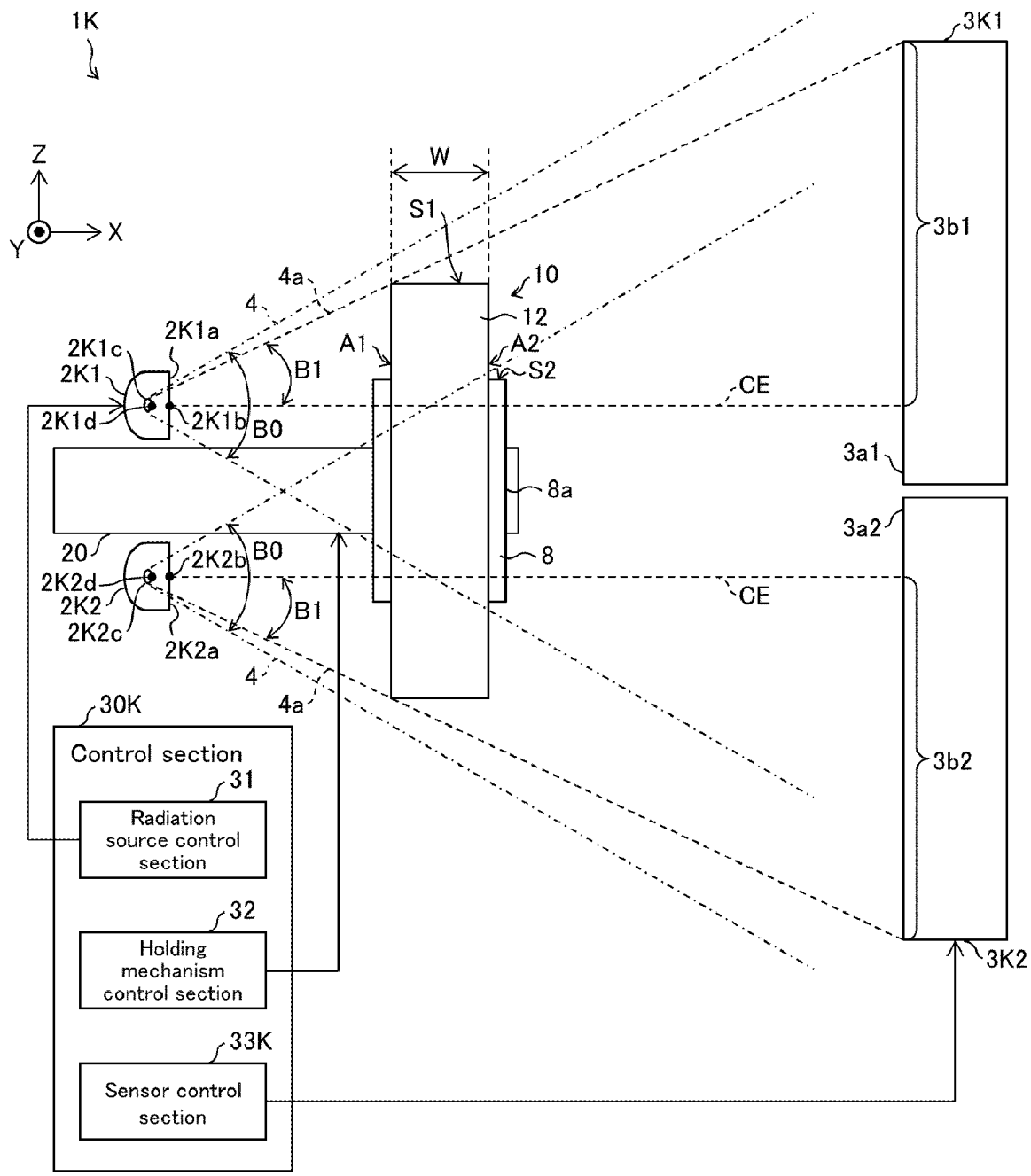
FIG. 23 is a diagram illustrating the configuration of a defect inspection device in accordance with a modification of Embodiment 9 of the present invention.

FIG. 23 is a diagram illustrating the configuration of a defect inspection device 1K in accordance with a modification of Embodiment 9 of the present invention. The defect inspection device 1K is identical to the defect inspection device 1J except that the defect inspection device 1K includes two radiation source sections.

The defect inspection device 1K includes radiation source sections 2K1 and 2K2, sensor sections 3K1 and 3K2, and a control section 30K in place of the radiation source section 2, the sensor sections 3J1 and 3J2, and the control section 30J of the defect inspection device 1J.

The radiation source sections 2K1 and 2K2 have respective emitting surfaces 2K1a and 2K2a, which correspond to the emitting surface 2a of the radiation source section 2. The emitting surfaces 2K1a and 2K2a have respective centers 2K1b and 2K2b, which correspond to the center 2b of the emitting surface 2a. The radiation source sections 2K1 and 2K2 have respective focuses 2K1c and 2K2c, which correspond to the focus 2c. The focuses 2K1c and 2K2c have respective centers 2K1d and 2K2d, which correspond to the center 2d of the focus 2c. The sensor sections 3K1 and 3K2 correspond to the sensor sections 3J 1 and 3J2. The sensor control section 33K controls driving of the sensor sections 3K1 and 3K2.

The defect inspection device 1K is configured such that the sensor sections 3K1 and 3K2 are disposed on top of each other, with the sensor section 3K1 and the sensor section 3K2 positioned above and below the rotation center of a separator roll 10 held by the holding mechanism 20 and that the radiation source sections 2K1 and 2K2 are also disposed on top of each other, with the radiation source section 2K1 and the radiation source section 2K2 positioned above and below the rotation center of a separator roll 10 held by the holding mechanism 20.

The defect inspection device 1K is capable of creating a captured image illustrated in FIG. 24 as with the defect inspection device 1J.

The defect inspection device 1J (see FIG. 22) is capable of carrying out defect inspection with use of a single radiation source section 2. The defect inspection device 1J, however, inspects the inside of a separator roll for a defect with use of an electromagnetic wave 4 passing through the core 8, and tends to create a captured image with a low resolution.

The defect inspection device 1K (see FIG. 23), in contrast, uses two radiation source sections 2K1 and 2K2 for defect inspection without an electromagnetic wave 4 passing through the core 8. The defect inspection device 1K needs to include a partition made of, for example, lead between the radiation source sections 2K1 and 2K2 to prevent the radiation source sections 2K1 and 2K2 disposed on top of each other from interfering with each other. The defect inspection device 1K may include, at a position adjacent to the respective emitting surfaces of the radiation source sections 2K1 and 2K2, a blocking plate for blocking an electromagnetic wave traveling in an unintended direction. This makes it possible to prevent the interference without greatly reducing the empty space inside the device.

The number of sensor sections in the defect inspection device 1K is not limited to two. The defect inspection device 1K may include three or more sensor sections that are disposed in point symmetry with the rotation center of a separator roll 10 held by the holding mechanism 20.

[Recap]

A defect inspection device in accordance with a first aspect of the present invention includes: a holding mechanism configured to hold a separator roll including (i) a core in a cylindrical shape and (ii) a separator for use in a battery which separator is wound around the core; a radiation source section configured to emit an electromagnetic wave to the separator roll; and a sensor section configured to detect the electromagnetic wave that the radiation source section emits to the separator roll, the separator roll being movable relative to the radiation source section, the sensor section being configured to detect the electromagnetic wave before and after the separator roll is moved relative to the radiation source section.

With the above configuration, the radiation source section emits an electromagnetic wave to a region of the separator roll before the relative movement of the separator roll and to a region of the separator roll which region is different from the above region after the relative movement. This makes it possible to obtain a captured image of a region of the separator roll before the relative movement of the separator roll and a captured image of a region of the separator roll which region is different from the above region after the relative movement. Thus, even in a case where the sensor section has a small detecting surface for detecting the electromagnetic wave, it is possible to obtain a captured image of a wide area of the separator roll. This in turn makes it possible to inspect a wide area of the separator roll for a defect and thus carry out accurate defect inspection.

The sensor section is configured to detect the electromagnetic wave before and after the separator roll is moved relative to the radiation source section. This makes it possible to obtain a captured image of the separator roll at rest. This in turn ensures a long exposure time period unlike in a case where an image is captured of a separator roll being conveyed, and thereby makes it possible to obtain a bright and clear captured image. The above configuration thus makes it possible to carry out defect inspection more accurately.

As described above, the above configuration makes it possible to carry out defect inspection accurately while preventing an increase of the time necessary for the defect inspection.

A defect inspection device in accordance with a second aspect of the present invention is configured as in the first aspect and may preferably be further configured such that the separator roll is moved relative to the radiation source section in such a manner that the defect inspection device obtains an image of a surface of the separator, wound around the core, which surface is close to the radiation source section. This configuration makes it possible to inspect the entire separator of the separator roll for a defect.

A defect inspection device in accordance with a third aspect of the present invention is configured as in the first or second aspect and may preferably be further configured such that the separator roll is rotated relative to the radiation source section in such a manner that the separator roll has a center corresponding to a rotation center. This configuration makes it possible to efficiently create a captured image of a wide region of the separator roll.

A defect inspection device in accordance with a fourth aspect of the present invention is configured as in any one of the first to third aspects and may preferably be further configured such that D2/D1 is more than 1 and not more than 40, where D1 is a distance from an emitting surface of the radiation source section to a second side surface of the separator roll which second side surface is one of opposite side surfaces of the separator roll and which second side surface is on a side on which the sensor section is present, and D2 is a distance from the emitting surface of the radiation source section to a detecting surface of the sensor section.

The above configuration makes it possible to (i) shorten the time length necessary for defect inspection of a separator roll and (ii) carry out the defect inspection accurately.

A defect inspection device in accordance with a fifth aspect of the present invention is configured as in any one of the first to fourth aspects and may preferably further include: a captured-image generating section configured to generate a captured image based on the electromagnetic wave detected by the sensor section, wherein the captured-image generating section is configured to combine a first captured image with a second captured image in such a manner that the first captured image and the second captured image partially overlap with each other, the first captured image being the captured image having been generated before the separator roll is moved relative to the radiation source section, the second captured image being the captured image having been generated after the separator roll is moved relative to the radiation source section.

The above configuration makes it possible to create a captured image of a wide area of the separator roll thoroughly.

A defect inspection device in accordance with a sixth aspect of the present invention is configured as in the fourth aspect and may preferably be further configured such that at least a portion of the captured image shows a portion of the core or a portion of an outer peripheral surface of the separator.

The above configuration makes it possible to create a captured image of a wide area of the separator roll thoroughly.

A defect inspection device in accordance with a seventh aspect of the present invention is configured as in any one of the first to sixth aspects and may preferably be further configured such that the electromagnetic wave is an X ray. This configuration makes it relatively easy to check whether there is any defect inside the separator wound around the core.

A defect inspection device in accordance with an eighth aspect of the present invention is configured as in the fifth or sixth aspect and may preferably be further configured such that a defect to be detected on a basis of the captured image is a metal foreign object. This configuration makes it possible to inspect a separator roll for a metal foreign object.

A defect inspection method in accordance with a ninth aspect of the present invention includes the steps of: (a) causing a radiation source section to emit an electromagnetic wave to a separator roll including (i) a core in a cylindrical shape and (ii) a separator for use in a battery which separator is wound around the core; and (b) detecting the electromagnetic wave having been emitted to the separator roll, the step (b) being a step of detecting the electromagnetic wave before and after the separator roll is moved relative to the radiation source section. This configuration makes it possible to carry out defect inspection accurately while preventing an increase of the time necessary for the defect inspection.

A method in accordance with a tenth aspect of the present invention for producing a separator roll may preferably include the step of: (a) inspecting, by the defect inspection method according to the ninth aspect, a separator roll for a defect, the separator roll including (i) a core in a cylindrical shape and (ii) a separator for use in a battery which separator is wound around the core, the defect being present inside the separator. This configuration makes it possible to produce a separator roll including a separator wound around a core which separator contains only a small number of defects such as a foreign object.

A method in accordance with an eleventh aspect of the present invention for production a separator roll is configured as in the tenth aspect and may preferably further include the steps of: (b) slitting an original sheet so as to prepare the separator, the original sheet having a width larger than a width of the separator; (c) winding the separator, prepared in the step (b), around the core so as to produce the separator roll; and (d) packaging the separator roll, produced in the step (c), wherein the step (a) is carried out after the step (b) and before the step (d).

The above configuration makes it possible to efficiently inspect, during the defect inspection step, a separator for any foreign object resulting from the slitting step, during which a foreign object tends to result. The above configuration also makes it possible to eliminate the need to, after a separator roll has been packaged, inspect the separator roll for a foreign object adhering to the separator.

A method in accordance with a twelfth aspect of the present invention for production a separator roll is configured as in the tenth or eleventh aspect and may preferably be further configured such that the step (a) is carried out in order to inspect the separator roll for a foreign object that is not less than 100 µm.

The above configuration makes it possible to produce a separator roll that contains only a small number of foreign objects which are not less than 100 µm or that contains no such foreign object.

A separator roll in accordance with a thirteenth aspect of the present invention may be produced by the method according to any one of the ninth to twelfth aspects. This configuration makes it possible to produce a separator roll containing only a small number of defects such as a foreign object.

A separator roll in accordance with a fourteenth aspect of the present invention includes: a core in a cylindrical shape; and a separator for use in a battery which separator is wound around the core, the separator roll containing, inside the separator, no foreign object that is not less than 100 µm. This configuration makes it possible to produce a separator roll with a low possibility that a foreign object adhering to the separator causes a failure.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 1C, 1D, 1E, 1H, 1J to 1L Defect inspection device
2 Radiation source section
2a Emitting surface
2b Center
3, 3C, 3H1, 3H2, 3J1, 3J2, 3 K1, 3K2 Sensor section
3b, 3b1, 3b2 Target region
3bC Defect inspection image
4, 4a Electromagnetic wave
5 Foreign object
6 Slitting apparatus
8 Core
8a Central hole
10, 10A, 10F, 10G Separator roll
12, 12F, 12G Separator
20, 20C, 20D Holding mechanism
30, 30C to 30E, 30H, 30J to 30L Control section
31 Radiation source control section
32, 32D Holding mechanism control section
33, 33C, 33H, 33J Sensor control section
203 Robot arm (holding mechanism)

What is claimed:

1. A method for producing a separator roll, the method comprising:
 (a) inspecting a separator roll for a defect by:
  (1) causing a radiation source section to emit an electromagnetic wave to the separator roll, the separator roll including (i) a core in a cylindrical shape and (ii) a separator for use in a battery which separator is wound around the core, and
  (2) detecting the electromagnetic wave having been emitted to the separator roll, the electromagnetic wave being detected before and after the separator roll is moved relative to the radiation source section,
wherein the defect is present inside the separator.

2. The method according to claim 1, further comprising the steps of:
 (b) slitting an original sheet so as to prepare the separator, the original sheet having a width larger than a width of the separator;
 (c) winding the separator, prepared in the step (b), around the core so as to produce the separator roll; and
 (d) packaging the separator roll, produced in the step (c), wherein
the step (a) is carried out after the step (b) and before the step (d).

3. The method according to claim 1,
wherein
the step (a) is carried out in order to inspect the separator roll for a foreign object that is not less than 100 µm.

* * * * *